United States Patent
Beeram et al.

(10) Patent No.: US 12,401,569 B2
(45) Date of Patent: Aug. 26, 2025

(54) NETWORK SLICING INCLUDING MODELING, DISTRIBUTION, TRAFFIC ENGINEERING AND MAINTENANCE

(71) Applicant: Juniper Networks, Inc., Sunnyvale, CA (US)

(72) Inventors: Vishnu Pavan Kumar Beeram, Ashburn, VA (US); Tarek Saad, Ottawa (CA); Jonathan C. Barth, Collegeville, PA (US); Chandrasekar Ramachandran, Bangalore (IN); Srihari Ramachandra Sangli, Bengaluru (IN)

(73) Assignee: Juniper Networks, Inc., Sunnyvale, CA (US)

( * ) Notice: Subject to any disclaimer, the term of this patent is extended or adjusted under 35 U.S.C. 154(b) by 616 days.

(21) Appl. No.: 17/514,855

(22) Filed: Oct. 29, 2021

(65) Prior Publication Data
US 2022/0141095 A1 May 5, 2022

(30) Foreign Application Priority Data
Oct. 30, 2020 (IN) .............................. 202041047431

(51) Int. Cl.
*H04L 41/12* (2022.01)
*H04L 41/0894* (2022.01)
(Continued)

(52) U.S. Cl.
CPC .......... *H04L 41/12* (2013.01); *H04L 41/0894* (2022.05); *H04L 41/0895* (2022.05);
(Continued)

(58) Field of Classification Search
CPC ......... H04L 41/12; H04L 45/50; H04L 45/74; H04L 41/0894; H04L 41/0895; H04L 41/122; H04L 41/5019
See application file for complete search history.

(56) References Cited

U.S. PATENT DOCUMENTS 9,794,165 B1 10/2017 Wood
9,898,317 B2 2/2018 Nakil et al.
(Continued)

FOREIGN PATENT DOCUMENTS

WO WO2021082575 * 8/2020

OTHER PUBLICATIONS

Ginsberg et al. "Advertising Generic Information in IS-IS" Internet Engineering Task Force (IETF), RFC 6823, Dec. 2010, 11 pp.
(Continued)

*Primary Examiner* — Yemane Mesfin
*Assistant Examiner* — Salma Ayad
(74) *Attorney, Agent, or Firm* — Shumaker & Sieffert, P.A.

(57) ABSTRACT

The techniques describe network slicing in computer networks. For example, a node receives a slice policy definition. The slice policy definition comprising a slice selector to identify packets belonging to one or more network slices, referred to as a "slice aggregate," and one or more network resource requirements for the slice aggregate to meet one or more Service Level Objectives (SLOs). The node configures, based on the slice policy definition, a path for the slice aggregate that complies with the one or more network resource requirements. In response to receiving a packet, the node determines whether the packet is associated with the slice aggregate and, in response to determining that the packet is associated with the slice aggregate, forwards the packet along the path for the slice aggregate.

17 Claims, 18 Drawing Sheets

(51) Int. Cl.
    *H04L 41/0895* (2022.01)
    *H04L 41/122* (2022.01)
    *H04L 41/5019* (2022.01)
    *H04L 45/50* (2022.01)
    *H04L 45/74* (2022.01)

(52) U.S. Cl.
    CPC ........ *H04L 41/122* (2022.05); *H04L 41/5019* (2013.01); *H04L 45/50* (2013.01); *H04L 45/74* (2013.01)

(56) References Cited

U.S. PATENT DOCUMENTS

| | | | |
|---|---|---|---|
| 10,277,505 | B2 | 4/2019 | Ratnasingham |
| 2017/0134538 | A1* | 5/2017 | Mahkonen ............... H04L 69/22 |
| 2019/0289647 | A1* | 9/2019 | Li ......................... H04L 41/122 |
| 2020/0221346 | A1* | 7/2020 | Park ...................... H04W 48/06 |
| 2020/0244588 | A1* | 7/2020 | Filsfils .................... H04L 41/12 |
| 2020/0322437 | A1* | 10/2020 | Mardente ............ H04L 67/1097 |
| 2021/0067439 | A1* | 3/2021 | Kommula ............. H04L 41/082 |
| 2021/0084582 | A1* | 3/2021 | Li .......................... H04W 24/02 |
| 2021/0119879 | A1* | 4/2021 | Zhang ................. H04L 41/0894 |

OTHER PUBLICATIONS

Ginsberg et al. "IS-IS Traffic Engineering (TE) Metric Extensions" Internet Engineering Task Force (IETF), RFC 8570, Mar. 2019, 21 pp.

Previdi et al. "IS-IS Extensions for Segment Routing" Internet Engineering Task Force (IETF), RFC 8667, Dec. 2019, 28 pp.

Psenak et al. "IS-IS Extensions to Support Segment Routing over IPv6 Dataplane" draft-ietf-lsr-isis-srv6-extensions-18, Network Working Group, Internet-Draft, Jun. 18, 2021, 29 pp.

Bahadur et al., "Mechanism for Performing Label Switched Path Ping (LSP Ping) over MPLS Tunnels," Internet Engineering Task Force (IETF), RFC 6424, Nov. 2011, 24 pp.

Awduche et al. "Requirements for Traffic Engineering Over MPLS" Network Working Group, RFC 2702, Sep. 1999, 29 pp.

Britto et al. "IGP Extensions for Support of Slice Aggregate Aware Traffic Engineering" draft-bestbar-lsr-slice-aware-te-00, LSR Working Group, Internet-Draft, Feb. 22, 2021, 24 pp.

Saad et al. "IGP Extensions for SR Slice Aggregate SIDs" draft-bestbar-lsr-spring-sa-01, LSR Working Group, Internet-Draft, Sep. 16, 2021, 12 pp.

\* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Type      |    Length     |            Flags              |
+-+-+-+-+-+-+-+-+-+-+-+-+-+-+-+-+-+-+-+-+-+-+-+-+-+-+-+-+-+-+-+-+
|   optional sub-sub-TLVs...
```

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Type      |     Length    |             Flags             |
+-+-+-+-+-+-+-+-+-+-+-+-+-+-+-+-+-+-+-+-+-+-+-+-+-+-+-+-+-+-+-+-+
|  optional sub-sub-TLVs...
```

FIG. 2C

```
                                          No. of octets
+---------------------------+
| System ID                 |             6
+---------------------------+
| Psuedonode Number         |             1
+---------------------------+
| Flags                     |             1
+---------------------------+
| Link Identification       |
| Information               |             0 to 24
+---------------------------+
| Sub-TLVs                  |             Optional
+---------------------------+
```

FIG. 2D

```
 0 1 2 3 4 5 6 7
+-+-+-+-+-+-+-+-+
|Reserved |S|F|I|
+-+-+-+-+-+-+-+-+
```

FIG. 2E

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Type      |    Length     |            Slice              |
+-+-+-+-+-+-+-+-+-+-+-+-+-+-+-+-+-+-+-+-+-+-+-+-+-+-+-+-+-+-+-+-+
|         Identifier            |    Priority   |     Flags     |
+-+-+-+-+-+-+-+-+-+-+-+-+-+-+-+-+-+-+-+-+-+-+-+-+-+-+-+-+-+-+-+-+
|                           Sub-TLVs                            |
+                                                               +
|                              ...                              |
+-+-+-+-+-+-+-+-+-+-+-+-+-+-+-+-+-+-+-+-+-+-+-+-+-+-+-+-+-+-+-+-+
```

FIG. 3A

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|  Type  |Subtype|     Length            |        Offset        |
+-+-+-+-+-+-+-+-+-+-+-+-+-+-+-+-+-+-+-+-+-+-+-+-+-+-+-+-+-+-+-+-+
|       value                                                   |
+-+-+-+-+-+-+-+-+-+-+-+-+-+-+-+-+-+-+-+-+-+-+-+-+-+-+-+-+-+-+-+-+
```

FIG. 3B

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|  Type  |Subtype|         Length        |     Preference       |
+-+-+-+-+-+-+-+-+-+-+-+-+-+-+-+-+-+-+-+-+-+-+-+-+-+-+-+-+-+-+-+-+
|                       Maximum Bandwidth                       |
+-+-+-+-+-+-+-+-+-+-+-+-+-+-+-+-+-+-+-+-+-+-+-+-+-+-+-+-+-+-+-+-+
|                      Shared Slice-group ID                    |
+-+-+-+-+-+-+-+-+-+-+-+-+-+-+-+-+-+-+-+-+-+-+-+-+-+-+-+-+-+-+-+-+
//                    Shared Slice-group ID                    //
+-+-+-+-+-+-+-+-+-+-+-+-+-+-+-+-+-+-+-+-+-+-+-+-+-+-+-+-+-+-+-+-+
```

FIG. 3C

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Type  |Subtype|         Length        |         Flags         |
+-+-+-+-+-+-+-+-+-+-+-+-+-+-+-+-+-+-+-+-+-+-+-+-+-+-+-+-+-+-+-+-+
|              Guaranteed bandwidth or percentage value         |
+-+-+-+-+-+-+-+-+-+-+-+-+-+-+-+-+-+-+-+-+-+-+-+-+-+-+-+-+-+-+-+-+
|                    Latency upper-bound value                  |
+-+-+-+-+-+-+-+-+-+-+-+-+-+-+-+-+-+-+-+-+-+-+-+-+-+-+-+-+-+-+-+-+
|                    Guaranteed rate <cir>                      |
+-+-+-+-+-+-+-+-+-+-+-+-+-+-+-+-+-+-+-+-+-+-+-+-+-+-+-+-+-+-+-+-+
|                     Shaping rate <pir>                        |
+-+-+-+-+-+-+-+-+-+-+-+-+-+-+-+-+-+-+-+-+-+-+-+-+-+-+-+-+-+-+-+-+
|         Burst-size            |   Protocol Hdr  |   Reserved  |
+-+-+-+-+-+-+-+-+-+-+-+-+-+-+-+-+-+-+-+-+-+-+-+-+-+-+-+-+-+-+-+-+
|                  Priority 0 Transmit rate <cir>               |
+-+-+-+-+-+-+-+-+-+-+-+-+-+-+-+-+-+-+-+-+-+-+-+-+-+-+-+-+-+-+-+-+
|                   Priority 0 Shaping rate <pir>               |
+-+-+-+-+-+-+-+-+-+-+-+-+-+-+-+-+-+-+-+-+-+-+-+-+-+-+-+-+-+-+-+-+
|     Priority 0 Burst-size     |P0 Queue-pri | P0 Buffersize   |
+-+-+-+-+-+-+-+-+-+-+-+-+-+-+-+-+-+-+-+-+-+-+-+-+-+-+-+-+-+-+-+-+
//                                                             //
|                  Priority 7 Transmit rate <cir>               |
+-+-+-+-+-+-+-+-+-+-+-+-+-+-+-+-+-+-+-+-+-+-+-+-+-+-+-+-+-+-+-+-+
|     Priority 7 Burst-size     |P7 Queue-pri| P7 Buffersize    |
+-+-+-+-+-+-+-+-+-+-+-+-+-+-+-+-+-+-+-+-+-+-+-+-+-+-+-+-+-+-+-+-+
```

FIG. 3D

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Type  |Prot   |       Length          |        Flags          |
+-+-+-+-+-+-+-+-+-+-+-+-+-+-+-+-+-+-+-+-+-+-+-+-+-+-+-+-+-+-+-+-+
|          IP Address                                            |
+-+-+-+-+-+-+-+-+-+-+-+-+-+-+-+-+-+-+-+-+-+-+-+-+-+-+-+-+-+-+-+-+
|   Masklen   |
+-+-+-+-+-+-+-+-+
//                                                             //
+-+-+-+-+-+-+-+-+-+-+-+-+-+-+-+-+-+-+-+-+-+-+-+-+-+-+-+-+-+-+-+-+
|          IP Address                                            |
+-+-+-+-+-+-+-+-+-+-+-+-+-+-+-+-+-+-+-+-+-+-+-+-+-+-+-+-+-+-+-+-+
|   Masklen   |
+-+-+-+-+-+-+-+-+
```

FIG. 3E

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Type          |Length | Flags |        Extended               |
+-+-+-+-+-+-+-+-+-+-+-+-+-+-+-+-+-+-+-+-+-+-+-+-+-+-+-+-+-+-+-+-+
|                       Admin Group                             |
+-+-+-+-+-+-+-+-+-+-+-+-+-+-+-+-+-+-+-+-+-+-+-+-+-+-+-+-+-+-+-+-+
```

FIG. 3F

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|            NLRI Type          |        Total NLRI Length      |
+-+-+-+-+-+-+-+-+-+-+-+-+-+-+-+-+-+-+-+-+-+-+-+-+-+-+-+-+-+-+-+-+
|                                                               |
//                  Link-State NLRI (variable)                 //
|                                                               |
+-+-+-+-+-+-+-+-+-+-+-+-+-+-+-+-+-+-+-+-+-+-+-+-+-+-+-+-+-+-+-+-+
```

FIG. 6A

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                        Slice Identifier                       |
+-+-+-+-+-+-+-+-+-+-+-+-+-+-+-+-+-+-+-+-+-+-+-+-+-+-+-+-+-+-+-+-+
```

FIG. 6B

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Type  |Subtype|         Length        |         Offset        |
+-+-+-+-+-+-+-+-+-+-+-+-+-+-+-+-+-+-+-+-+-+-+-+-+-+-+-+-+-+-+-+-+
|                      value (variable size)                    |
+-+-+-+-+-+-+-+-+-+-+-+-+-+-+-+-+-+-+-+-+-+-+-+-+-+-+-+-+-+-+-+-+
```

FIG. 6C

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Type  |Subtype|         Length        |       Preference      |
+-+-+-+-+-+-+-+-+-+-+-+-+-+-+-+-+-+-+-+-+-+-+-+-+-+-+-+-+-+-+-+-+
|                       Maximum Bandwidth                       |
+-+-+-+-+-+-+-+-+-+-+-+-+-+-+-+-+-+-+-+-+-+-+-+-+-+-+-+-+-+-+-+-+
|                      Shared Slice-group ID                    |
+-+-+-+-+-+-+-+-+-+-+-+-+-+-+-+-+-+-+-+-+-+-+-+-+-+-+-+-+-+-+-+-+
//                    Shared Slice-group ID                    //
+-+-+-+-+-+-+-+-+-+-+-+-+-+-+-+-+-+-+-+-+-+-+-+-+-+-+-+-+-+-+-+-+
```

FIG. 6D

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Type  |Subtype|         Length        |         Flags         |
+-+-+-+-+-+-+-+-+-+-+-+-+-+-+-+-+-+-+-+-+-+-+-+-+-+-+-+-+-+-+-+-+
|             Guaranteed bandwidth or percentage value          |
+-+-+-+-+-+-+-+-+-+-+-+-+-+-+-+-+-+-+-+-+-+-+-+-+-+-+-+-+-+-+-+-+
|                    Latency upper-bound value                  |
+-+-+-+-+-+-+-+-+-+-+-+-+-+-+-+-+-+-+-+-+-+-+-+-+-+-+-+-+-+-+-+-+
|                       Guaranteed rate <cir>                   |
+-+-+-+-+-+-+-+-+-+-+-+-+-+-+-+-+-+-+-+-+-+-+-+-+-+-+-+-+-+-+-+-+
|                       Shaping rate <pir>                      |
+-+-+-+-+-+-+-+-+-+-+-+-+-+-+-+-+-+-+-+-+-+-+-+-+-+-+-+-+-+-+-+-+
|         Burst-size            |  Protocol Hdr |   Reserved    |
+-+-+-+-+-+-+-+-+-+-+-+-+-+-+-+-+-+-+-+-+-+-+-+-+-+-+-+-+-+-+-+-+
|                   Priority 0 Transmit rate <cir>              |
+-+-+-+-+-+-+-+-+-+-+-+-+-+-+-+-+-+-+-+-+-+-+-+-+-+-+-+-+-+-+-+-+
|                    Priority 0 Shaping rate <pir>              |
+-+-+-+-+-+-+-+-+-+-+-+-+-+-+-+-+-+-+-+-+-+-+-+-+-+-+-+-+-+-+-+-+
|      Priority 0 Burst-size    |P0 Queue-pri | P0 Buffersize   |
+-+-+-+-+-+-+-+-+-+-+-+-+-+-+-+-+-+-+-+-+-+-+-+-+-+-+-+-+-+-+-+-+
//                                                             //
|                   Priority 7 Transmit rate <cir>              |
+-+-+-+-+-+-+-+-+-+-+-+-+-+-+-+-+-+-+-+-+-+-+-+-+-+-+-+-+-+-+-+-+
|      Priority 7 Burst-size    |P7 Queue-pri| P7 Buffersize    |
+-+-+-+-+-+-+-+-+-+-+-+-+-+-+-+-+-+-+-+-+-+-+-+-+-+-+-+-+-+-+-+-+
```

FIG. 6E

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Type  |Prot |           Length          |       Flags         |
+-+-+-+-+-+-+-+-+-+-+-+-+-+-+-+-+-+-+-+-+-+-+-+-+-+-+-+-+-+-+-+-+
|           IP Address                                          |
+-+-+-+-+-+-+-+-+-+-+-+-+-+-+-+-+-+-+-+-+-+-+-+-+-+-+-+-+-+-+-+-+
|  Masklen  |
+-+-+-+-+-+-+-+-+
//                                                             //
+-+-+-+-+-+-+-+-+-+-+-+-+-+-+-+-+-+-+-+-+-+-+-+-+-+-+-+-+-+-+-+-+
|           IP Address                                          |
+-+-+-+-+-+-+-+-+-+-+-+-+-+-+-+-+-+-+-+-+-+-+-+-+-+-+-+-+-+-+-+-+
|  Masklen  |
+-+-+-+-+-+-+-+-+
```

FIG. 6F

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Type              |Length | Flags |         Extended          |
+-+-+-+-+-+-+-+-+-+-+-+-+-+-+-+-+-+-+-+-+-+-+-+-+-+-+-+-+-+-+-+-+
|                     Admin Group                               |
+-+-+-+-+-+-+-+-+-+-+-+-+-+-+-+-+-+-+-+-+-+-+-+-+-+-+-+-+-+-+-+-+
```

FIG. 6G

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Type (Slice TLV)              | Length                        |
+-+-+-+-+-+-+-+-+-+-+-+-+-+-+-+-+-+-+-+-+-+-+-+-+-+-+-+-+-+-+-+-+
|                            Slice ID                           |
+-+-+-+-+-+-+-+-+-+-+-+-+-+-+-+-+-+-+-+-+-+-+-+-+-+-+-+-+-+-+-+-+
|    BW requested for Slice (32-bit IEEE floating point)        |
+-+-+-+-+-+-+-+-+-+-+-+-+-+-+-+-+-+-+-+-+-+-+-+-+-+-+-+-+-+-+-+-+
```

FIG. 7A

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Type (Protected Slice TLV)    | Length                        |
+-+-+-+-+-+-+-+-+-+-+-+-+-+-+-+-+-+-+-+-+-+-+-+-+-+-+-+-+-+-+-+-+
|                            Slice ID                           |
+-+-+-+-+-+-+-+-+-+-+-+-+-+-+-+-+-+-+-+-+-+-+-+-+-+-+-+-+-+-+-+-+
|    BW requested for Slice (32-bit IEEE floating point)        |
+-+-+-+-+-+-+-+-+-+-+-+-+-+-+-+-+-+-+-+-+-+-+-+-+-+-+-+-+-+-+-+-+
|                         Backup Slice ID                       |
+-+-+-+-+-+-+-+-+-+-+-+-+-+-+-+-+-+-+-+-+-+-+-+-+-+-+-+-+-+-+-+-+
| Backup BW requested for Slice (32-bit IEEE floating point)    |
+-+-+-+-+-+-+-+-+-+-+-+-+-+-+-+-+-+-+-+-+-+-+-+-+-+-+-+-+-+-+-+-+
```

FIG. 7B

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|      Type     |     Length    |         Label Position        |
+-+-+-+-+-+-+-+-+-+-+-+-+-+-+-+-+-+-+-+-+-+-+-+-+-+-+-+-+-+-+-+-+
|                            Slice-ID                           |
+-+-+-+-+-+-+-+-+-+-+-+-+-+-+-+-+-+-+-+-+-+-+-+-+-+-+-+-+-+-+-+-+
```

FIG. 8A

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|      Type     |     Length    |      Flow Label Mask Offset   |
+-+-+-+-+-+-+-+-+-+-+-+-+-+-+-+-+-+-+-+-+-+-+-+-+-+-+-+-+-+-+-+-+
|                            Slice-ID                           |
+-+-+-+-+-+-+-+-+-+-+-+-+-+-+-+-+-+-+-+-+-+-+-+-+-+-+-+-+-+-+-+-+
```

FIG. 8B

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|      Type     |     Length    |     Flags     |    RESERVED   |
+-+-+-+-+-+-+-+-+-+-+-+-+-+-+-+-+-+-+-+-+-+-+-+-+-+-+-+-+-+-+-+-+
|                            Slice-ID                           |
+-+-+-+-+-+-+-+-+-+-+-+-+-+-+-+-+-+-+-+-+-+-+-+-+-+-+-+-+-+-+-+-+
|                    Slice Label                    | TC  | NBZ.|
+-+-+-+-+-+-+-+-+-+-+-+-+-+-+-+-+-+-+-+-+-+-+-+-+-+-+-+-+-+-+-+-+
|                          CIR/CBR/??                           |
+-+-+-+-+-+-+-+-+-+-+-+-+-+-+-+-+-+-+-+-+-+-+-+-+-+-+-+-+-+-+-+-+
```

FIG. 8C

NETWORK SLICING INCLUDING MODELING, DISTRIBUTION, TRAFFIC ENGINEERING AND MAINTENANCE

This application claims the benefit of India Provisional Patent Application No. 202041047431, filed on Oct. 30, 2020, which is hereby incorporated by reference herein in its entirety.

TECHNICAL FIELD

The invention relates to computer networks.

BACKGROUND

A wide variety of customer devices connect to service provider networks to access resources and services provided by packet-based data networks, such as the Internet, enterprise intranets, content providers, and virtual private networks (VPNs). Each service provider network typically provides an extensive network infrastructure to provide packet-based data services to the customer devices. The service provider networks may comprise a wide area network (WAN). In some examples, each service provider network may comprise a single autonomous system (AS) within a WAN that includes multiple ASes. In other examples, each service provider network may comprise two or more ASes within the WAN.

The network infrastructure of a service provider network typically includes a vast collection of access nodes, aggregation nodes and high-speed edge routers interconnected by communication links. These network devices typically execute various protocols and exchange signaling messages to anchor and manage subscriber sessions and communication flows associated with customer devices. Network service providers often include infrastructure configured to apply network services to subscriber packet flows, such as security, tunneling, virtual private networks, filtering, load-balancing, VoIP/Multimedia processing and various types of application proxies (HTTP, XML, WAP). Service providers also provide content-specific services designed to improve the quality of a user's experience, for example, video streaming and caching.

One technique, referred to as network slicing, is a specific form of virtualization that allows multiple logical networks to run on top of a shared physical network infrastructure. Network slicing provides the ability to partition a physical network into multiple logical networks of varying sizes, structures, and functions so that each slice can be dedicated to specific services or customers. When logical networks are run on top of the shared physical network infrastructure, traffic belonging to a network slice may be steered to the resources allocated for that slice. A Quality of Service (QoS) profile may be applied to the traffic in order to provide corresponding Service Level Agreement (SLA) guarantees.

SUMMARY

In general, techniques are described herein for providing comprehensive solutions to enable network slicing in computer networks. Network slicing technology combines network virtualization techniques along with resources allocations to offer strict Service Level Objectives (SLOs) within each network slice of an infrastructure. Techniques are described herein for instantiating one or more network slices, referred to as a "slice aggregate," including the modeling, distribution, provisioning, traffic engineering and maintenance of the slice aggregate. In some examples, the techniques enable the provisioning of a network-wide consistent slice policy definition for a slice aggregate on participating network elements. For example, a device data model is used to provide a consistent view of the slice policy definition to all participating devices that provides a technology agnostic solution for flexible device-specific slice definition, distribution and enforcement through various data plane and control plane options. The slice policy definition, for example, enables a given network element to be configured to provide the desired forwarding treatment or "Per-Hop Behavior (PHB)" for traffic associated with a particular slice aggregate.

For example, in accordance with the techniques described herein, a controller may generate a slice policy definition for a slice aggregate. As further described, the slice policy definition is used herein to refer to data representing a network-wide construct that includes rules that control, for example, data plane policies, control plane policies, and topology membership policies to be implemented by network devices to realize the slice aggregate.

Based on the slice policy definition, a network device may be configured to identify one or more packets belonging to a slice aggregate and apply a forwarding treatment or slice policy per hop behavior ("S-PHB") associated with the slice aggregate that guarantees SLA requirements. For example, network devices are configured to identify a slice aggregate associated with the packet using a slice policy data plane selector (referred to herein as "slice selector") carried by the packet and determine a forwarding behavior (e.g., S-PHB) to be applied to the packet, such as providing a specified amount of network resources (e.g., as specified by the slice policy definition) for the traffic belonging to the specific slice aggregate. In some examples, network devices may determine the packet includes a Differentiated Services (Diffserv) class selector (CS), which is used to determine a particular forwarding treatment to be applied to traffic belonging to the same slice policy. That is, the Diffsery CS is used to differentiate between different types of traffic carried over the same slice aggregate.

The techniques may provide one or more technical advantages that realize specific practical applications. For example, by specifying a slice policy definition in accordance with the techniques described in this disclosure, service providers may configure network equipment to use the slice policy definition to provide a consistent, end-to-end network connectivity service to meet SLOs where the SLO is defined in terms of traffic engineering and Quality of Service guarantees like bandwidth, bounded latency or data sovereignty. Furthermore, techniques may be utilized to isolate and/or share the specific network resources assigned to a slice aggregate across multiple slice aggregates depending on the service offered. Moreover, by generating a slice policy definition for a slice aggregate rather than for individual network slices, each network device may instead maintain state information for a slice aggregate rather than for each network slice, which provides for a more scalable network slicing solution.

In one example, the disclosure describes techniques for a network controller comprising: a memory; one or more processors operably coupled to the memory, wherein the one or more processors are configured to: receive a network slice intent to instantiate one or more network slices having a logical network topology to connect a plurality of network slice endpoints using one or more nodes of an underlay network in accordance with one or more Service Level Objectives (SLOs); map the one or more network slices to a slice aggregate, wherein the slice aggregate comprises one or more packet flows belonging to the one or more network slices; generate a slice policy definition for the slice aggregate, wherein the slice policy definition comprises: a slice selector used to identify packets belonging to the slice aggregate, and one or more network resource requirements for the slice aggregate to meet the one or more SLOs; and send the slice policy definition to the one or more nodes of the underlay network to configure the one or more nodes to allocate one or more network resources, based on the one or more network resource requirements, for the slice aggregate for forwarding packets including the slice selector.

In another example, the disclosure describes techniques for a node of a plurality of nodes of an underlay network comprising: a forwarding component; and a routing component configured to: receive a slice policy definition, wherein the slice policy definition comprises: a slice selector to identify packets belonging to a slice aggregate, wherein the slice aggregate comprises one or more packet flows belonging to one or more network slices having a logical network topology to connect a plurality of network slice endpoints using one or more nodes of an underlay network in accordance with one or more Service Level Objectives (SLOs), and one or more network resource requirements for the slice aggregate to meet the one or more SLOs; configure, based on the slice policy definition, a path for the slice aggregate that complies with the one or more network resource requirements; wherein, in response to the configuration of the path for the slice aggregate, the forwarding component is configured to: receive a packet; determine whether the packet is associated with the slice aggregate; and in response to determining that the packet is associated with the slice aggregate, forward the packet along the path for the slice aggregate.

In another example, the disclosure described techniques including a method comprising: receiving, by a node of a plurality of nodes in an underlay network, a slice policy definition, wherein the slice policy definition comprises: a slice selector to identify packets belonging to a slice aggregate, wherein the slice aggregate comprises one or more packet flows belonging to one or more network slices having a logical network topology to connect a plurality of network slice endpoints using one or more nodes of an underlay network in accordance with one or more Service Level Objectives (SLOs), and one or more network resource requirements for the slice aggregate to meet the one or more SLOs; configuring, by the node and based on the slice policy definition, a path for the slice aggregate that complies with the one or more network resource requirements; receiving, by the node, a packet; determining, by the node, whether the packet is associated with the slice aggregate; and in response to determining that the packet is associated with the slice aggregate, forwarding, by the node, the packet along the path for the slice aggregate.

The details of one or more examples of the techniques are set forth in the accompanying drawings and the description below. Other features, objects, and advantages of the techniques will be apparent from the description and drawings, and from the claims.

BRIEF DESCRIPTION OF DRAWINGS

FIGS. 2A-2G illustrate examples of using IGP for slice aggregate aware traffic engineering, in accordance with the techniques described in this disclosure.

FIGS. 3A-3F illustrate examples of using IGP to advertise a slice policy definition, in accordance with the techniques described in this disclosure.

FIGS. 6A-6G illustrate examples of using BGP-LS to advertise a slice policy definition, in accordance with the techniques described in this disclosure.

FIGS. 7A-7B illustrate examples of RSVP-TE extensions to facilitate slice aware path placement, in accordance with the techniques described in this disclosure.

FIGS. 8A-8C illustrate examples of OAM extensions to validate network slices, in accordance with the techniques described in this disclosure.

DETAILED DESCRIPTION

Figure 1:
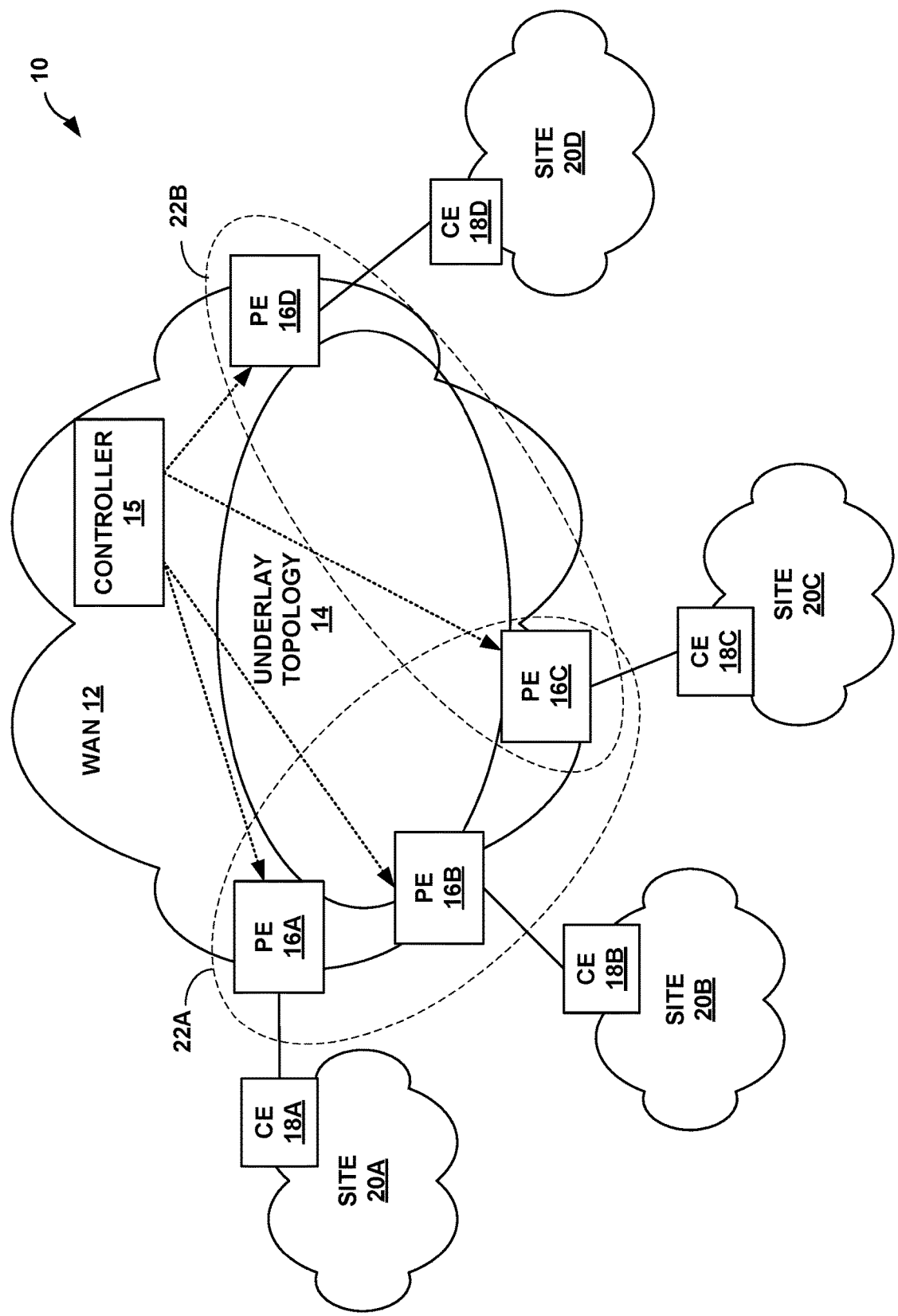
FIG. 1 is a block diagram illustrating an example wide area network having a controller and network devices configured to enable network slicing, in accordance with the techniques described in this disclosure.

FIG. 1 is a block diagram illustrating an example wide area network (WAN) having a controller and network devices configured to enable and operate using network slicing, in accordance with the techniques described in this disclosure.

As illustrated in FIG. 1, network system 10 includes WAN 12 having underlay topology 14 and a plurality of remote sites 20A-20D ("sites 20") connected to WAN 12. In some examples, WAN 12 may support one or more virtual networks 22A, 22B ("virtual networks 22") on top of underlay topology 14 in order to connect one or more of sites 20 across WAN 12. More specifically, virtual networks 22 may enable sites 20 to securely share data over WAN 12. For example, virtual networks 22 may comprise virtual private network (VPNs) or network slices configured with different performance and scaling properties.

WAN 12 may comprise the Internet or another public network. In some cases, WAN 12 may comprise a multi-protocol label switching (MPLS) network. In some cases, WAN 12 may comprise a mobile communication network, such as a 5G mobile network. WAN 12 has underlay network topology 14. Underlay topology 14 may comprise an Internet Protocol (IP) fabric of nodes and links. Although illustrated in FIG. 1 as a single topology, in one example underlay topology 14 of WAN 12 may comprise two or more autonomous systems (ASes). In this example, WAN 12 and the disclosed techniques support inter-AS connectivity. Each AS may comprise a collection of network devices under the control of a network service provider that offers services to customers at sites 20 that access WAN 12. Services offered may include, for example, traditional Internet access, VoIP, video and multimedia services, and security services. Further example details of inter-AS connectivity in a WAN are described in U.S. patent application Ser. No. 15/084,769, filed Mar. 30, 2016, the entire contents of which are incorporated herein by reference.

In the illustrated example of FIG. 1, WAN 12 includes a controller device 15 and PE routers 16A-16D ("PE routers 16"). Controller 15 of WAN 12 may comprise a software defined network (SDN) controller that provides centralized control of customer sessions and communication flows within WAN 12 by configuring and managing the virtual networks established over underlay topology 14. Controller 15, therefore, may configure and manage the routing and switching infrastructure within WAN 12 (e.g., including PE routers 16 and additional transit routers (e.g., provider (P) routers) and switches not shown in FIG. 1). Further example details of an SDN controller are described in U.S. Pat. No. 9,898,317, issued Feb. 20, 2018, and U.S. Pat. No. 9,794,165, issued Oct. 17, 2017, the entire contents of each of which are incorporated herein by reference.

Each of PE routers 16 couples to one or more of remote sites 20 via customer edge (CE) routers 18A-18D ("CE routers 18"). For example, PE router 16A is coupled to site 20A via CE router 18A, PE router 16B is coupled to site 20B via CE router 18B, PE router 16C is coupled to site 20C via CE router 18C, and PE router 16D is coupled to site 20D via CE router 18D. Each of PE routers 16 maintains a link state database (LSDB) associated with a link state routing protocol of interior gateway protocol (IGP), such as open shortest path first (OSPF) and intermediate system-to-intermediate system (IS-IS). The contents of the LSDB of a given PE router, e.g., PE router 20A, includes a full view of underlay topology 14 of WAN 12.

Each of sites 20 may include a local area network (LAN) or a wide area network (WAN) that comprises a plurality of subscriber devices, such as desktop computers, laptops, workstations, PDAs, wireless devices, network-ready appliances, file servers, print servers or other devices. In some examples, at least one of sites 20 may comprise a data center site having specialized facilities that provide storage, management, and dissemination of data to subscribers and other entities. A data center site may include, for example, a plurality of servers and storage area networks (SANs) that provide computing environments for subscribers/customers. Subscriber devices may connect to the data center site to request and receive services and data provided by the data center site.

As described above, one or more of sites 20 may be connected via virtual networks established across WAN 12 to enable sites 20 to securely share data over WAN 12. As shown in FIG. 1, sites 20A-20C are connected across WAN 12 via virtual network 22A that includes participating PE routers 16A-16C. In addition, sites 20C and 20D are connected across WAN 12 via virtual network 22B that includes participating PE routers 16C and 16D.

The techniques of this disclosure are directed to supporting enabling network slicing in which multiple virtual networks 22, for example, operate over underlay network topology 14 of WAN 12. The techniques may provide support for network slicing as required by the 5G mobile network specification being developed by the $3^{rd}$ Generation Partnership Project (3GPP), which envisions a set of overlay networks with different performance and scaling properties over a common underlay network, as well as enhanced VPN services in general. Current example solutions require storing per-VPN state on every resource (link or node) in the underlay network which is inherently unscalable.

Network slicing allows a service provider to create independent and logical networks (e.g., virtual networks 22A and 22B) on top of a common or shared physical network infrastructure, e.g., underlay topology 14. Such network slices can be offered to customers or used internally by the service provider to facilitate or enhance their service offerings. A service provider may use network slicing to structure and organize the elements of its infrastructure, e.g., by connecting a number of endpoints using a set of shared or dedicated network resources that are used to satisfy specific Service Level Objectives (SLOs).

In the example of FIG. 1, controller 15 may generate a slice policy definition (also referred to herein simply as "slice policy") to instantiate one or more network slices, referred to herein as "slice aggregate." For example, controller 15 may include a northbound interface to receive a network slice intent, e.g., from a customer (e.g., administrator of WAN 12) that specifies the requirements to realize the slice aggregate, and a southbound interface to instantiate the slice aggregate in network system 10.

A slice aggregate can span multiple parts of an IP/MPLS network, e.g., WAN 12. For example, a slice aggregate may span network resources in the access network, aggregation network, or core network, and/or may stretch across multiple operator domains. As described herein, virtual networks 22A and 22B may each represent one or more network slices and may be alternatively referred to herein as slice aggregate 22A and slice aggregate 22B (collectively, referred to herein as "slice aggregates 22"). Although slice aggregates 22 are illustrated as pertaining only to PEs 16, the slice aggregates may also pertain to provider routers ("P routers") in the core network (not shown), or other network devices in network system 10.

A slice aggregate may include all or a subset of physical nodes (e.g., PEs 16) and links of WAN 12, and may be comprised of dedicated and/or shared network resources (e.g., processing power, storage, and bandwidth). For example, physical network resources may be dedicated to a specific slice aggregate such that traffic that belongs to the slice aggregate may traverse the dedicated resources without contention from traffic of another slice aggregate. In other words, network resources dedicated to a specific slice aggregate allows for simple partitioning of the physical network resources among slice aggregates without the need to distinguish packets traversing the dedicated network resources because only a single traffic stream for a slice aggregate can use the dedicated resources at any time. Alternatively, or additionally, physical network resources may be shared. That is, the physical network resource capacity is divided among multiple slice aggregates. As further described below, PEs 16 may partition network resources in the data plane (e.g., by applying hardware policers and shapers). PEs 16 may partition the control plane by providing a logical representation of the physical link that has a subset of the network resources available to it.

A network slice intent may specify requirements for a slice aggregate, such as the connectivity needs between endpoints (e.g., point-to-point, point-to-multipoint, or multipoint-to-multipoint) with customizable network capabilities that may include data speed, quality, latency, reliability, security, and services. These capabilities may be provided based on a Service Level Agreement between a network slice consumer and the provider. In some examples, controller 15 may translate the network slice intent into a slice policy definition (also referred to herein as "slice policy") in accordance with a network slicing model, as described in this disclosure. In some examples, an orchestrator (not shown) may receive the network slice intent from an administrator and may translate the network slice intent into a slice policy definition in accordance with a network slicing model that may be instantiated by controller 15 to configure the network devices to realize the network slices. Controller 15 may maintain a mapping between one or more network slices and a slice aggregate. Controller 15 may map the network slice intent to a suitable topology and resource allocations, and/or service mappings on PEs 16 for steering of network slice traffic. As described below, controller 15 may configure a slice policy definition for the slice aggregate and sends the slice policy definition to one or more of the network devices (e.g., PEs 16) using, for example, NETCONF or RESTCONF, gRPC, or other routing protocols such as IGP or BGP, to instantiate the slice aggregate. In some examples, the YANG data model is used to specify the slice policy definition.

The slice policy definition may include data plane policies, control plane policies, and topology membership policies for a slice aggregate. Network devices belonging to the slice aggregate may configure its data plane in accordance with the data plane policies of the slice policy definition. Data plane policies may include a slice selector (SS), firewall rules or flow-spec filters, Quality of Service (QOS) profiles associated with the slice aggregate and any classes within the slice aggregate. The slice selector is used to associate traffic belonging to a slice aggregate. For example, network devices, such as Pes 16, that receive a packet including a slice selector may use the slice selector to identify a slice aggregate associated with the packet and apply a respective per hop behavior ("PHB") that is associated with the slice aggregate (referred to herein as "slice policy per hop behavior" or "S-PHB"). The S-PHB defines, for example, the scheduling treatment and, in some cases, the packet drop probability.

In some examples, a slice selector may assign a forwarding address (e.g., IP address) or label (e.g., MPLS label) for the slice aggregate. Assigning a unique forwarding address or MPLS forwarding label to each slice aggregate allows packets for the slice aggregates to be distinguished by the destination address or MPLS forwarding label that is carried in the packet.

In some examples, the slice selector includes a global identifier slice selector to identify a specific slice aggregate. The global identifier slice selector is independent of the forwarding address or MPLS label associated with the destination. In these examples, routers within the slice policy domain, such as PEs 16, may use the IP address or MPLS label associated with the destination to determine the forwarding path, and use the global identifier slice selector to determine an associated slice aggregate and specific per-hop behavior to be applied to the packet. Specifying a global identifier slice selector provides for better scaling since it relies on a single forwarding address or MPLS label binding to be used independent of the number of slice policies required along the path. In these examples, the global slice selector is included in a packet and maintained in the packet as it traverses the slice policy domain. In some examples, the global identifier slice selector may be a global MPLS label carried in the label stack (e.g., top of the label stack, bottom of the label stack, or at an unfixed place in the label stack).

Network devices belonging to the slice aggregate may configure its control plane in accordance with the control plane policies of the slice policy definition. Control plane policies may include the amount of resources to be allocated for the network slice (e.g., maximum guaranteed bandwidth), any network resource sharing requirements among network slices (e.g., maximum shared bandwidth), and/or any priorities to reserve resources for specific network slices over others (referred to herein as "resource reservation priorities"). In some examples, the control plane policies may specify an upper bound of required resources, lower bound of required resources, a range of required resources, resource availability, or the like. Some example resource requirements may include a guaranteed minimum bandwidth, guaranteed maximum bandwidth, guaranteed upper bound latency, minimal permissible jitter, packet loss rate, network function resources, availability, resource redundancy, security, resolution of guarantee, resources isolation, or other resource requirements.

Topology membership policies include one or more policies that dictate node, link, or function network resource topology association for a specific slice policy. In some examples, the slice policy topology may span multiple administrative domains and/or multiple data plane technologies. In these examples, a slice policy topology may overlap or share a subset of links with another slice policy topology. Filtering policies may be applied to the slice policy to limit the specific topology elements that belong to the slice policy. For example, a topology membership policy may include a topology filtering policy that leverages the use of resource affinities to include or exclude certain links for a specific slice aggregate. In some examples, a topology membership policy may include a predefined topology (e.g., derived from a flexible algorithm definition or multi-topology identifier).

In some examples, the slice policy definition may specify a mode to realize a slice aggregate in only the data plane (referred to herein as "data plane slice policy mode"), only the control plane (referred to herein as "control plane slice policy mode"), or both the control and data planes (referred to herein as "data and control plane slice policy mode"). If a slice policy definition specifies a data plane slice policy mode, packets are to be forwarded on specific slice aggregate network resources and apply a specific forwarding treatment associated with the slice aggregate as specified by the slice policy definition. If data plane slice policy mode is used, PEs 16 may include a slice selector in each packet to identify the slice aggregate that the packet belongs to. Moreover, an ingress node of a slice policy domain (e.g., PE 16A of slice aggregate 22A) may, in addition to including a Diffsery CS, add a slice selector to each slice aggregate packet such that intermediate nodes ("transit nodes") within the slice policy domain may use the slice selector to associate packets with a slice aggregate and to determine the slice policy per hop behavior that is applied to the packet. The Diffsery CS may be used to apply a specific per hop behavior on the packet to allow differentiation of traffic treatment within the same slice aggregate. When data plane slice policy mode is used, PEs 16 may rely on a network state independent view of the topology to determine the best paths to reach destinations. For example, PEs 16 may implement segment routing flexible-algorithm to steer packets on the IGP computed lowest cumulative delay path. A slice policy may be used to allow links along the least latency path to share its data plane resources among multiple slice aggregates. In this case, the packets that are steered on a specific slice policy carry the slice selector (along with the Diffsery CS) that enables routers to determine the S-PHB and enforce slice aggregate traffic streams.

A slice policy definition specifying a control plane slice policy mode causes an ingress router of the slice policy domain to perform path computation based on the control plane policies specified in the slice policy definition. For example, the physical network resources in the network may be logically partitioned by having a representation of network resources appear in a virtual topology. The virtual topology can contain all or a subset of the physical network resources. The logical network resources that appear in the virtual topology can reflect a part, whole, or in-excess of the physical network resource capacity (when oversubscription is desirable). For example, a physical link bandwidth can be divided into fractions, each dedicated to a slice aggregate. Each fraction of the physical link bandwidth may be represented as a logical link in a virtual topology that is used when determining paths associated with a specific slice aggregate. The virtual topology associated with the slice policy can be used by routing protocols, or by the ingress/PCE when computing slice aggregate aware TE paths.

To perform network state dependent path computation in this mode (slice aggregate aware TE), the resource reservation on each link needs to be slice aggregate aware. Multiple slice policies may be applied on the same physical link. The slice aggregate network resource availability on links is updated (and may eventually be advertised in the network) when new paths are placed in the network. The slice aggregate resource reservation, in this case, can be maintained on each device or be centralized on a resource reservation manager that holds reservation states on links in the network.

Multiple slice aggregates can form a group and share the available network resources allocated to each slice aggregate. In this case, a node can update the reservable bandwidth for each slice aggregate to take into consideration the available bandwidth from other slice aggregates in the same group.

A slice policy definition specifying a data and control plane slice policy mode causes network resources to be partitioned in both the control plane and data plane. Control plane partitioning allows the creation of customized topologies per slice aggregate that routers or a path computation engine can use to determine optimal path placement for specific demand flows (e.g., slice aggregate aware TE). Data plane partitioning protects slice aggregate traffic from network resource contention that may occur due to bursts in traffic from other slice aggregates traversing the same shared network resource.

In some examples, controller 15 may send the slice policy definition to each of PEs 16 using, for example, NETCONF, RESTCONF, gRPC, or other transport mechanism to send the slice policy definition. In some examples, controller 15 may send the slice policy definition to one or more proxy nodes (e.g., any of PEs 16 or other nodes in WAN 12) to distribute the slice policy definition to each of PEs 16. By using a proxy node to distribute the slice policy definition, the overhead for distributing the slice policy definition to all routers in the network is reduced. In these examples, a proxy node may use IGP (e.g., IS-IS or OSPF) to flood the slice policy definition, such as in a sub-TLV of the IGP message, and/or use BGP (e.g., BGP-LS) to advertise the slice policy definition across domains. Additional examples of advertising the slice policy definition are described below.

PEs 16 may receive the slice definition from controller 15 (or from the proxy router) and may configure its data plane and/or control plane to realize the slice aggregate based on the parameters specified in the slice policy definition. Each of PEs 16 may configure its control plane based on the control plane policies specified in the slice policy definition and/or configure its data plane based on the data plane policies specified in the slice policy definition. As one example, PE 16A may receive a slice policy definition specifying control plane parameters specifying a guaranteed upper bound latency for slice aggregate 22A. In this example, PE 16A may configure its control plane to compute a delay optimized path in accordance with the guaranteed upper bound latency specified in the slice definition, and configure its data plane to identify packets associated with the slice aggregate 22A using the slice selector specified in the data plane policy and to apply a particular forwarding behavior to the packet (e.g., forwarding on the delay optimized path).

In some examples, PEs 16 may use routing protocols to carry network slice link state information including slice aggregate information (also referred to herein as "slice aggregate link state") to advertise the slice aggregate information to other PE routers belonging to the slice aggregate, as further described below. For example, each of PEs 16 that is a member of a given slice aggregate within the slicing domain may use IGP (e.g., IS-IS and OSPF) to advertise attributes of resources classes throughout the slicing domain to facilitate a per slice traffic engineering path placement by an ingress router (e.g., PE 16A) or a centralized path computation engine hosted by controller 15. That is, the nodes of a slicing domain may advertise the current state of resource utilization for each slice for each of its links that are being sliced. In some examples, PEs 16 may use BGP-LS to advertise per-subclass and per-slice link resource utilization information, e.g., within Network Layer Reachability Information (NLRI) ("Slice-Link NLRI"), across domains in the network. In some examples, RSVP-TE is used to facilitate slice aware path placement. For example, a path message of RSVP-TE may include bandwidth requested for a network slice for a protected or unprotected LSP.

Once the data plane and/or control plane is configured, PEs 16 may identify a packet as belonging to a slice aggregate and apply forwarding treatment (referred to herein as "per hop behavior" or "PHB") associated with the slice aggregate. In the example of FIG. 1, PE 16A represents a network slice edge node for slice aggregate 22A. PE 16A may receive traffic to be steered over network resources specific to slice aggregate 22A. In this example, PE 16A may receive a packet from site 20A and determine from information included in the packet (e.g., 5-tuple in the IP and transport protocol headers) that the packet is to be forwarded along network slice 22A. PE 16A may include the slice selector associated with network slice 22A (in accordance with the slice policy definition) within the packet to cause other routers (e.g., PEs 16B and 16C) to apply a specific forwarding treatment that guarantees the SLAs for slice aggregate 22A (e.g., forwarding on the delay optimized path that meets the guaranteed upper bound latency requirements in the example above). In a similar example, PE 16D may receive a packet from site 20D and determine from information included in the packet that the packet is to be forwarded along slice aggregate 22B. PE 16D may include the slice selector associated with slice aggregate 22B within the packet to cause other routers (e.g., PE 16C) to apply a specific forwarding treatment that guarantees the SLAs for slice aggregate 22B. In some examples, PE routers may support multiple forwarding treatments over the same slice aggregate. In these examples, PEs 16 may include a Diffsery CS in the packet to differentiate between different types of traffic carried over the same slice aggregate.

Although intermediate (i.e., transit devices) such as provider routers are not shown for ease of illustration, the intermediate devices may receive network slice traffic and may identify the packets as belonging to a specific slice aggregate based on the slice selector included in the packet or by inspecting other fields within the packet that may identify specific flows as belonging to a specific slice aggregate. Intermediate devices may also determine that packet includes a Diffsery CS, and in response, may apply a forwarding treatment associated with the Diffsery CS value to allow differentiation of forwarding treatments for packets forwarded over the same slice aggregate.

In some examples, PEs 16 may implement Operations, Administration, and Management (OAM) to validate the slice aggregate. For example, PEs 16 may use OAM to determine whether the slice selector (e.g., MPLS label) is pointing to the correct slice, whether the downstream forwarding interfaces are correct, whether the QoS on downstream forwarding interfaces is correct, etc. In these examples, an ingress router of the network slice domain may compose the target forwarding equivalence class (FEC) stack in the MPLS OAM echo packet. A transit router may validate the top label. A replying router includes a downstream detailed mapping object for each interface over which the FEC could be forwarded. The downstream label may include a set of labels in the label stack as it would have appeared if the router were forwarding the packet through the interface.

FIGS. 2A-2G illustrate examples of using IGP for slice aggregate aware traffic engineering, in accordance with the techniques described in this disclosure.

In the examples of FIGS. 2A-2B, slice aggregate traffic engineering capabilities is advertised in an APPsub-TLV under a GENINFO TLV of an IS-IS, as described in L. Ginsberg, et al., "Advertising Generic Information in IS-IS," RFC 6823, December 2010, the entire contents of which is incorporated by reference herein. A router may advertise an APPsub-TLV to indicate its ability to install slice aggregate specific next hops. In the example of FIG. 2A, the APPsub-TLV includes a TLV type, the length of the TLV, and a value (illustrated as "optional sub-sub-TLVs") that specifies a slicing capability flag to indicate whether the advertising router supports per slice next hop filtering, as shown in FIG. 2B.

In the examples of FIGS. 2C-2E, slice aggregate traffic engineering link information used by a slice aggregate aware traffic engineering application is advertised in an APPsub-TLV under the GENINFO TLV. In the example of FIG. 2C, the APPsub-TLV includes a TLV type, the length of the TLV, and a value (illustrated as "optional sub-sub-TLVs") that specifies link information used by a slice aggregate aware traffic engineering application, as shown in FIG. 2D. In the example of FIG. 2D, the value field of the slice aggregate aware traffic engineering link APPsub-TLV ("SA-TE link APPsub-TLV") may include a system identifier, pseudonode number, flags, link identification information, and sub-TLVs. The link identification information could have any or all of the link local identifier, IPv4 interface address and IPv6 interface address of the link. FIG. 2E illustrates an example of the flags field, which includes bit flags S, F, and I. When the I bit is set, a link local identifier associated with the link immediately follows the flags. When the F bit is set, the interface address of the link immediately follows either the flags (e.g., if IP bit is clear) or link local identifier (e.g., if I bit is set). When the S bit is set, the IPv6 interface address of the link immediately follows the flags (e.g., if both F and I bits are clear) or the link local identifier (e.g., if the I bit is set but F bit is not set) or the IPv4 address (e.g., if the F bit is set).

Figure 2F:
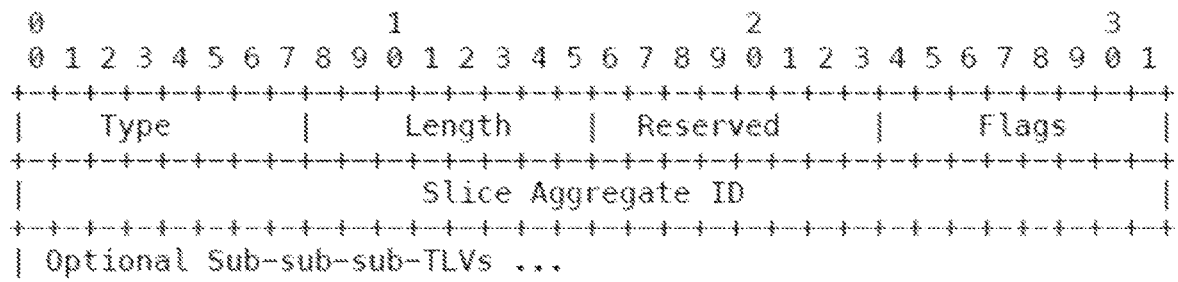
Figure 2G:
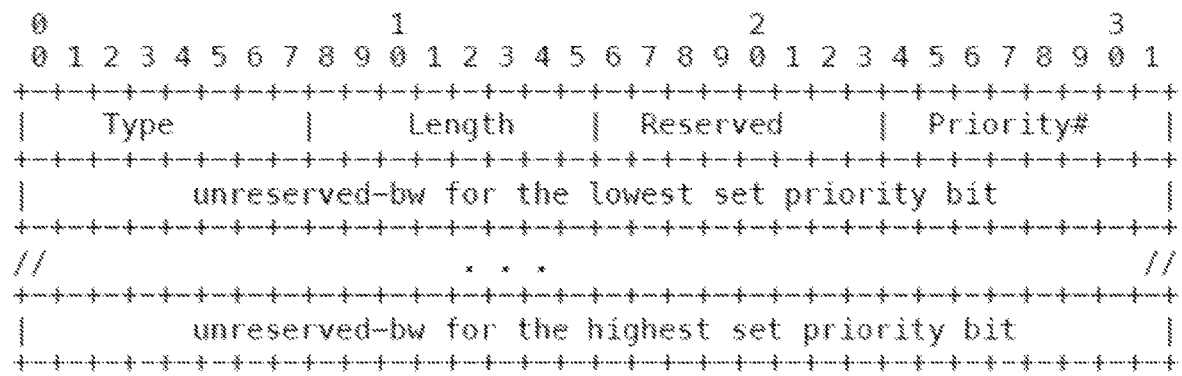

In the examples of FIGS. 2F-2G, slice aggregate traffic engineering link attributes is advertised in a sub-sub-TLV under the SA-TE link APPsub-TLV ("SA-TE link attributes sub-sub-TLV"). A router may advertise the sub-sub-TLV to advertise various bandwidth attributes on a particular link for a specific network slice aggregate. In the example of FIG. 2F, the sub-sub-TLV under the SA-TE link APPsub-TLV includes a TLV type, the length of the TLV, and a value that specifies a slice aggregate identifier.

In the example of FIG. 2G, slice aggregate traffic engineering unreserved bandwidth is advertised in a sub-sub-sub-TLV under the SA-TE link attributes sub-sub-TLV (illustrated as "Optional sub-sub-sub-TLVs" in FIG. 2F). A router may advertise the sub-sub-sub-TLV to advertise unreserved bandwidth on a particular link for a specific network slice aggregate. As one example, the sub-sub-sub-TLV under the SA-TE link attributes sub-sub-TLV includes a TLV type, the length of the TLV, and a value that specifies one or more unreserved link bandwidths on the link where each unreserved bandwidth entry corresponds to a non-zero bit in the priority field, starting at least the least significant bit.

In some examples, the sub-sub-sub-TLV under the SA-TE link attributes sub-sub-TLV may specify a residual bandwidth on a particular link for a specific network slice aggregate, an available bandwidth on a particular link for a specific network slice aggregate, or a utilized bandwidth on a particular link for a specific network slice aggregate. Additional examples of the format of the above messages is described in L. Ginsberg, Ed., et al., "IS-IS Traffic Engineering (TE) Metric Extensions," RFC 8570, March 2019, the entire contents of which is incorporated by reference herein.

FIGS. 3A-3F illustrate examples of using IGP to advertise a slice policy definition, in accordance with the techniques described in this disclosure. FIG. 3A illustrates an example of a slice definition ("SDEF") sub-TLV used to announce each network slice. For example, the slice definition sub-TLV may include a type of the TLV, length of the TLV, a slice identifier, priority, and flags. As further illustrated in FIGS. 3B-3F, the sub-TLV of the slice definition sub-TLV may include information of the slice policy definition (e.g., data plane policies, control plane policies, topology membership policies).

As illustrated in FIG. 3B, the sub-TLV of the slice definition sub-TLV may include a slice data plane indicator ("SDI sub-TLV"). In the example of FIG. 3B, the SDI sub-TLV includes a type of the sub-TLV, the subtype, length of the TLV, offset, and value. Example subtype values may include an MPLS label value at Type of Service (ToS), MPLS label value at offset, MPLS label range, MPLS label range at offset, IPv4 address and mask length, IPv4 address and start mask length and end mask length, IPv6 address and mask length, IPv6 address and start mask length and end mask length, SRv6 SID, SRv6 segment routing header (SRH) at offset, or a firewall filter name. The offset may indicate the number of bytes from the bottom of an MPLS or SRH header stack.

As illustrated in FIG. 3C, the sub-TLV of the slice definition sub-TLV may include a slice resource TLV ("SRES-TLV"). In the example of FIG. 3C, the SRES-TLV includes a type of the sub-TLV, the subtype, length of the TLV, preference, network slice resource (e.g., maximum bandwidth), and one or more shared slice group identifiers. As one example, the preference field may indicate preferential treatment for path setup and the shared slice group identifier may indicate the slice group that the network slice is part of for sharing resources.

As illustrated in FIG. 3D, the sub-TLV of the slice definition sub-TLV may include a slice QoS TLV ("SQoS-TLV"). In the example of FIG. 3D, the SQoS-TLV includes a type of the sub-TLV, the subtype, length of the TLV, flags, guaranteed bandwidth or percentage value, latency upper-bound value, guaranteed rate (CIR), shaping rate (PIR), burst size, protocol header, and one or more priorities for the transmit and/or shaping rate.

As illustrated in FIG. 3E, the sub-TLV of the slice definition sub-TLV may include a slice membership IP-prefix TLV ("SMIP-TLV"). In the example of FIG. 3E, the SMIP-TLV includes a type of the sub-TLV, the protocol (e.g., IPv4, IPv6), length of the TLV, flags, and one or more IP addresses and mask length (e.g., 32-bit or 128-bit).

As illustrated in FIG. 3F, the sub-TLV of the slice definition sub-TLV may include slice membership information, such as a slice membership slice-membership exclude admin-group TLV ("SMEAG-TLV"), a slice-membership include any-group TLV ("SMIANY-TLV"), or a slice-membership include all-group TLV ("SMIALL-TLV"). In the example of FIG. 2M, the sub-TLVs including the slice membership information includes a type of the sub-TLV, length of the TLV, flags, and an admin group.

FIGS. 4A-4D illustrate examples using IGP to advertise segment routing slice aggregate SIDs, in accordance with the techniques described in this disclosure.

Figure 4A:
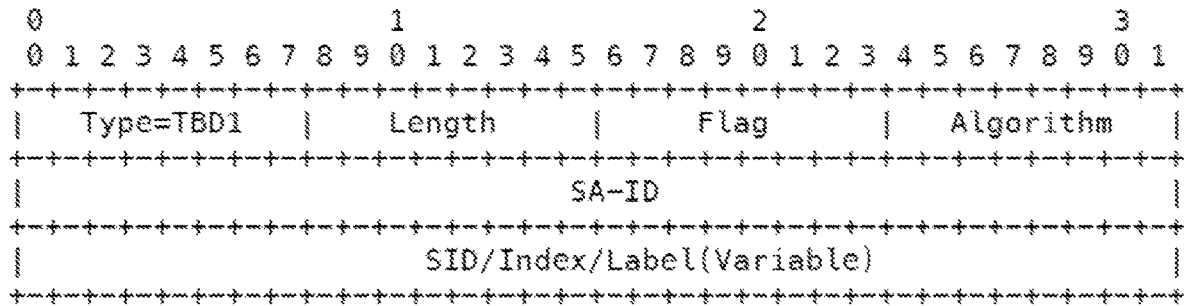
FIGS. 4A-4D illustrate examples using IGP to advertise segment routing slice aggregate SIDs, in accordance with the techniques described in this disclosure.

In the example of FIG. 4A, a slice aggregate prefix-SID is advertised in an IS-IS SR slice aggregate prefix-SID ("SA prefix-SID") sub-TLV. Additional examples of the format of the prefix-SID sub-TLV is described in S. Previdi, Ed., et al., "IS-IS Extensions for Segment Routing," RFC 8667, December 2019, the entire contents of which is incorporated by reference herein. In the example of FIG. 4A, the SA prefix-SID sub-TLV includes a type of the TLV, length of the TLV, an algorithm value (e.g., IGP algorithm type), specific slice aggregate within the IGP domain ("SA-ID"), and a SID/index/label value depending on the flag. In some examples, the SA prefix-SID sub-TLV may be present in an extended IPv4 reachability TLV, multitopology IPv4 reachability TLV, IPv6 IP reachability TLV, or multitopology IPv6 IP reachability TLV.

Figure 4B:
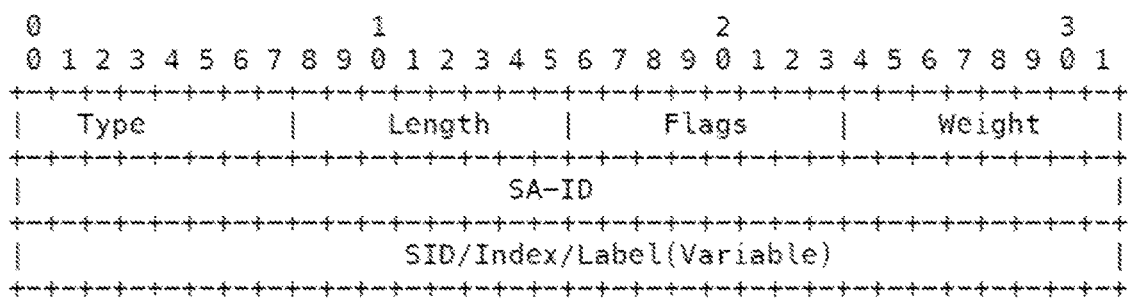

In the example of FIG. 4B, a slice aggregate adjacency-SID is advertised in an IS-IS SR slice aggregate adjacency-SID ("SA adj-SID") sub-TLV. Additional examples of the format of the adjacency-SID sub-TLV is described in RFC 8667 incorporated by reference above. In the example of FIG. 4B, the SA adj-SID sub-TLV includes a type of the TLV, length of the TLV, specific slice aggregate within the IGP domain ("SA-ID"), and a SID/index/label value depending on the flag. In some examples, the SA adj-SID sub-TLV may be present in an extended IS reachability TLV, multitopology IS TLV, IS neighbor attribute TLV, multitopology IS neighbor attribute TLV, or inter-AS reachability information TLV.

Figure 4C:
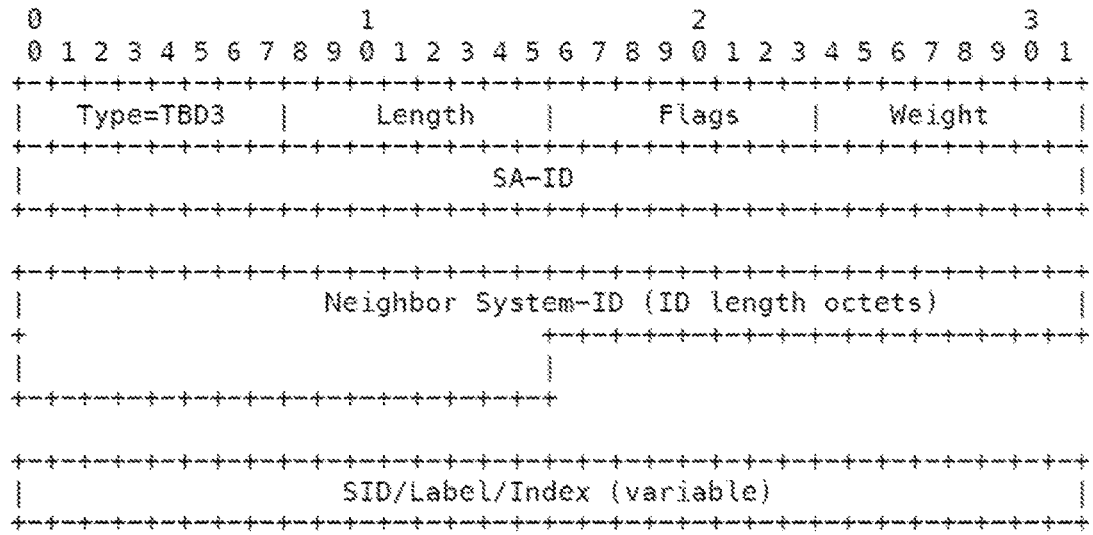

In the example of FIG. 4C, a slice aggregate LAN adjacency-SID is advertised in an IS-IS SR slice aggregate LAN adjacency-SID ("SA LAN-adj-SID") sub-TLV. Additional examples of the format of the adjacency-SID sub-TLV is described in RFC 8667 incorporated by reference above. In the example of FIG. 4C, the SA LAN-adj-SID sub-TLV includes a type of the TLV, length of the TLV, specific slice aggregate within the IGP domain ("SA-ID"), neighbor system identifier, and a SID/index/label value depending on the flag. In some examples, the SA LAN-adj-SID sub-TLV may be present in an extended IS reachability TLV, multitopology IS TLV, IS neighbor attribute TLV, multitopology IS neighbor attribute TLV, or inter-AS reachability information TLV. Multiple adj-SID sub-TLVs may be associated with a single IS-IS neighbor.

Figure 4D:
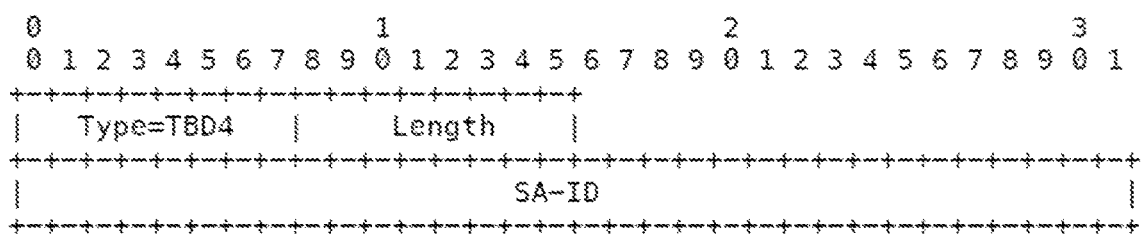

In the example of FIG. 4D, a SRv6 SID slice aggregate is advertised in a sub-sub-TLV of an SRv6 End SID sub-TLV ("SRv6 SA SID sub-sub-TLV"). Additional examples of the format of the Srv6 End sub-TLV is described in P. Psenak, Ed., et al., "IS-IS Extensions to Support Segment Routing over IPv6 Dataplane," Internet-Draft, draft-ietf-lsr-isis-srv6-extensions-17," Jun. 18, 2021, the entire contents of which is incorporated by reference herein. In the example of FIG. 4D, the SRv6 SA SID sub-sub-TLV includes a type of the TLV, length of the TLV, and specific slice aggregate within the IGP domain ("SA-ID"). In some examples, the SRv6 SA SID sub-sub-TLV may be present in a Srv6 End SID Sub-TLV, Srv6 End.X SID Sub-TLV, or SRv6 LAN End.X SID Sub-TLV.

Figure 5:
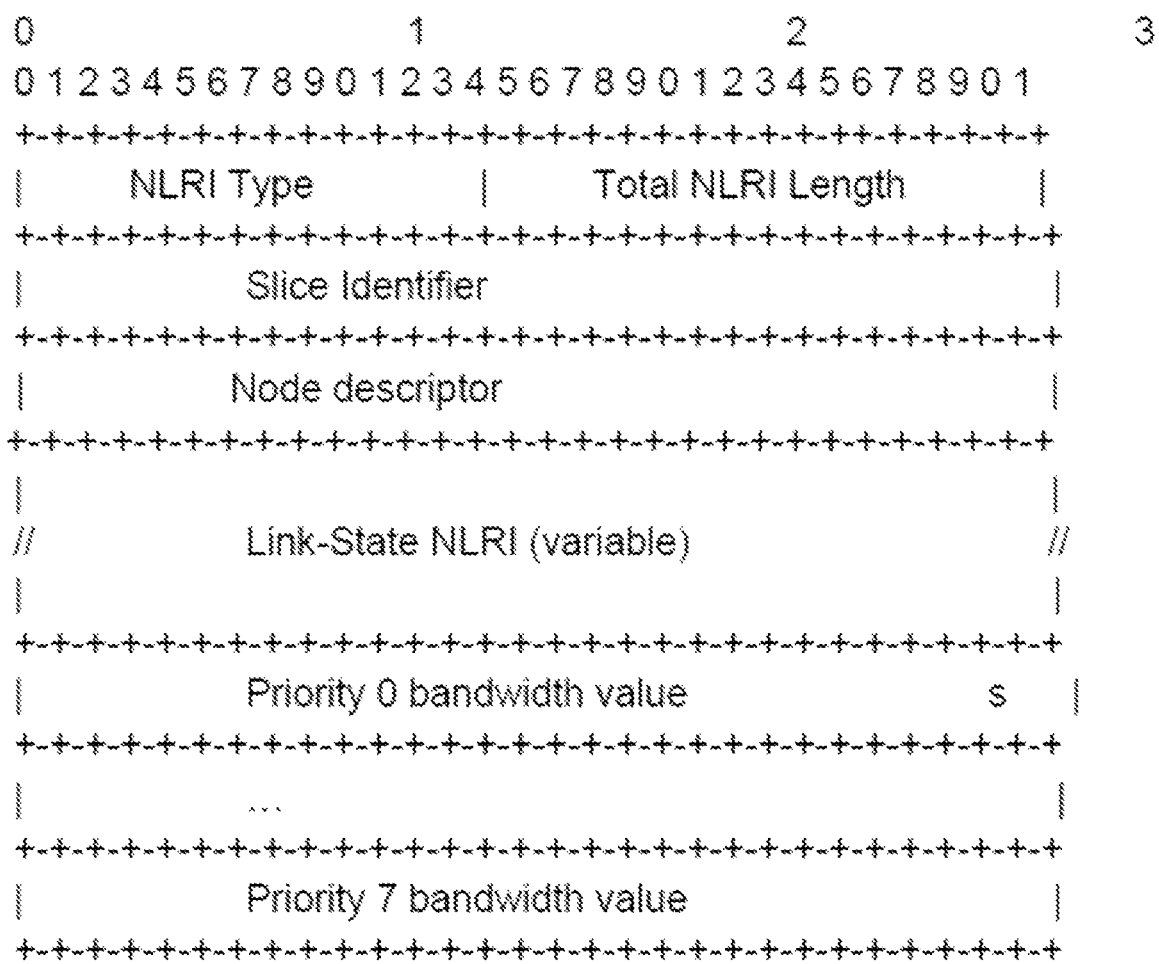
FIG. 5 illustrates an example of a BGP-LS extension for distributing per-slice link state information, in accordance with the techniques described in this disclosure.

FIG. 5 illustrates an example of a BGP-LS extension for distributing per-slice link state information, in accordance with the techniques described in this disclosure. In the example of FIG. 5, a Network Layer Reachability Information (NLRI) (referred to herein as "Slice-Link NLRI") is used to advertise the per-subclass and per-slice link resource utilization information. For example, the Slice-Link NLRI includes an NLRI type, the length of the NLRI, a slice identifier, a node descriptor, link state NLRI, and one or more priority bandwidth values. The slice identifier is used as a key to refer to the link NLRI in the network.

FIGS. 6A-6G illustrate examples of using BGP-LS to advertise a slice policy definition, in accordance with the techniques described in this disclosure. FIG. 6A illustrates an example of a BGP-LS NLRI to distribute the slice policy definition across domains in the network (referred to herein as "slice definition NLRI"). The BGP-LS NLRI includes an NLRI type, the length of the NLRI, and a link-state NLRI that may specify one or more slice identifiers, as illustrated in FIG. 6B. As further illustrated in FIGS. 6C-6F, the TLV of the BGP-LS attribute for the slice definition NLRI may include information of the slice policy definition (e.g., data plane policies, control plane policies, topology membership policies).

As illustrated in FIG. 6C, the TLV of the slice definition NLRI may include a slice data plane indicator ("SDI TLV"). In the example of FIG. 6C, the SDI TLV includes a type of the TLV, the subtype, length of the TLV, offset, and value. Example subtype values may include an MPLS label value at Type of Service (ToS), MPLS label value at offset, MPLS label range, MPLS label range at offset, IPv4 address and mask length, IPv4 address and start mask length and end mask length, IPv6 address and mask length, IPv6 address and start mask length and end mask length, SRv6 SID, SRv6 segment routing header (SRH) at offset, or a firewall filter name. The offset may indicate the number of bytes from the bottom of an MPLS or SRH header stack.

As illustrated in FIG. 6D, the TLV of the slice definition NLRI may include a slice resource TLV ("SRES-TLV"). In the example of FIG. 6D, the SRES-TLV includes a type of the TLV, the subtype, length of the TLV, preference, network slice resource (e.g., maximum bandwidth), and one or more shared slice group identifiers. As one example, the preference field may indicate preferential treatment for path setup and the shared slice group identifier may indicate the slice group that the network slice is part of for sharing resources.

As illustrated in FIG. 6E, the TLV of the slice definition NLRI may include a slice QoS TLV ("SQoS-TLV"). In the example of FIG. 6E, the SQoS-TLV includes a type of the sub-TLV, the subtype, length of the TLV, flags, guaranteed bandwidth or percentage value, latency upper-bound value, guaranteed rate (CIR), shaping rate (PIR), burst size, protocol header, and one or more priorities for the transmit and/or shaping rate.

As illustrated in FIG. 6F, the TLV of the slice definition NLRI may include a slice membership IP-prefix TLV ("SMIP-TLV"). In the example of FIG. 6F, the SMIP-TLV includes a type of the sub-TLV, the protocol (e.g., IPv4, IPv6), length of the TLV, flags, and one or more IP addresses and mask length (e.g., 32-bit or 128-bit).

As illustrated in FIG. 6F, the TLV of the slice definition NLRI may include slice membership information, such as a slice membership slice-membership exclude admin-group TLV ("SMEAG-TLV"), a slice-membership include any-group TLV ("SMIANY-TLV"), or a slice-membership include all-group TLV ("SMIALL-TLV"). In the example of FIG. 2M, the sub-TLVs including the slice membership information includes a type of the sub-TLV, length of the TLV, flags, and an admin group.

FIGS. 7A-7B illustrate examples of RSVP-TE extensions to facilitate slice aware path placement, in accordance with the techniques described in this disclosure. FIG. 7A illustrates an example of a TLV including bandwidth requested for a network slice for an unprotected LSP (referred to herein as "slice TLV"). For example, the slice TLV includes a type of the TLV (e.g., slice TLV type), the length of the TLV, a slice identifier, and the bandwidth requested for the network slice. FIG. 7B illustrates an example of a TLV including bandwidth requested for a network slice and backup bandwidth requested for the network slice for a protected LSP (referred to herein as "protected slice TLV"). For example, the protected slice TLV includes a type of the TLV (e.g., protected slice TLV type), the length of the TLV, a slice identifier, the bandwidth requested for the network slice, a backup slice identifier, and the bandwidth requested for the backup network slice.

FIGS. 8A-8C illustrate examples of OAM extensions to validate network slices, in accordance with the techniques described in this disclosure. FIG. 8A illustrates an example of a TLV including a type of the TLV, length of the TLV, label position of the slice selector in a label stack, and the slice identifier that is to be validated. Based on the TLV, a router may extract the label from the packet and validate the label against the FEC carried in an echo request packet.

FIG. 8B illustrates an example of a TLV including a type of the TLV, length of the TLV, flow label mask offset, and the slice identifier that is to be validated. A router may extract the IPv6 flow label from an incoming echo request packet, and extract the slice label by the flow label mask offset in the TLV. The slice identifier is validated against the slice label on this hop.

FIG. 8C illustrates an example of a TLV including network slicing downstream QoS profile information. For example, the TLV may represent a downstream detailed mapping (DDMAP) sub-TLV. Additional examples of the DDMAP TLV is described in N. Bahadur, et al., "Mechanism for Performing Label Switched Path Ping (LSP Ping) over MPLS Tunnels," RFC 6424, November 2011, the entire contents of which is incorporated by reference herein. The DDMAP sub-TLV may include a type of the TLV, length of the TLV, flags, a slice identifier, a slice label, and a bandwidth a committed information rate (CIR), committed burst size (CBS), excess information rate (EIR), or excess burst size (EBS). Before responding with an echo reply message, a router may, in addition to including the forwarding information (e.g., DS labels, DS interface, etc.), include the per slice or per Diffsery class information in the DDMAP sub-TLV.

Figure 9:
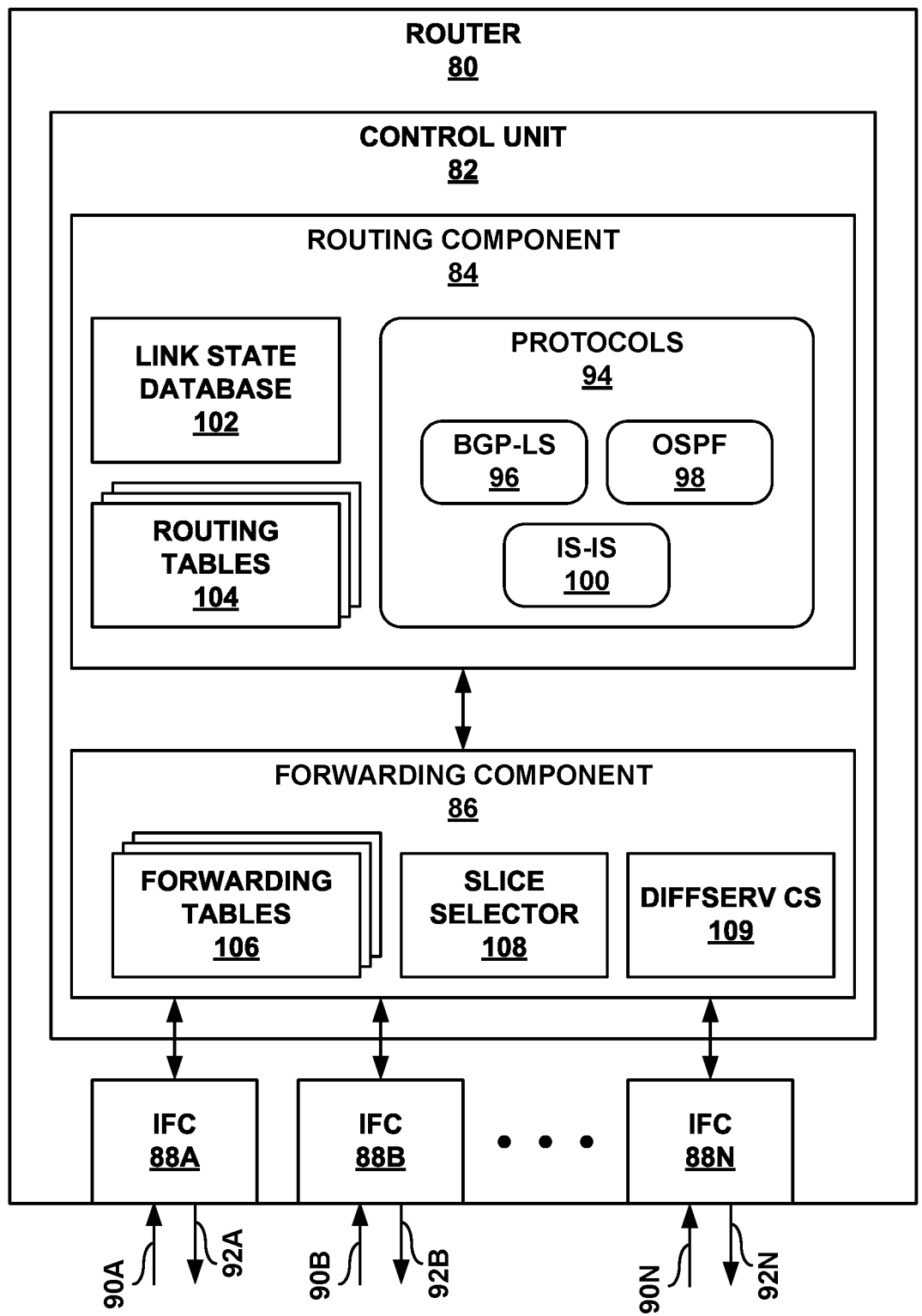
FIG. 9 is a block diagram illustrating an example router configured in accordance with the techniques of this disclosure.

FIG. 9 is a block diagram illustrating an example router 80 configured in accordance with the techniques of this disclosure.

In general, router 80 may operate substantially similar to any of PEs 16 of FIG. 1. In the illustrated example of FIG. 4, router 80 includes interface cards 88A-88N ("IFCs 88") that receive packets via incoming links 90A-90N ("incoming links 90") and send packets via outbound links 92A-92N ("outbound links 92"). IFCs 88 are typically coupled to links 90, 92 via a number of interface ports. Router 80 also includes a control unit 82 that determines routes of received packets and forwards the packets accordingly via IFCs 88.

Control unit 82 may comprise a routing component 84 and a forwarding component 86. Control unit 82 provides an operating environment for routing component 84 and may be implemented solely in software, or hardware, or may be implemented as a combination of software, hardware or firmware. For example, control unit 82 may include one or more processors (not shown) which execute software instructions. In that example, routing component 84 may include various software modules or daemons (e.g., one or more routing protocol processes, management processes, user interfaces, and the like), and control unit 82 may include a computer-readable storage medium, such as computer memory or hard disk, for storing executable instructions.

Routing component 84 operates as the control plane for router 80 and includes an operating system that provides a multi-tasking operating environment for execution of a number of concurrent processes. Routing component 84 may implement one or more protocols 94 to execute routing processes. For example, protocols 94 may include BGP-LS 96, OSPF 98, and IS-IS 100 for exchanging link state information with other routing devices in the computer network. Routing component 84 uses the Interior Gateway Protocol (IGP) link state routing protocols, OSPF 98 and IS-IS 100, to exchange routing information with other routing devices in the same IGP area or autonomous system (AS) in order to discover the topology of the IGP area or AS and update link state database (LSDB) 102. Routing component 84 maintains LSDB 102 configured to store link state information about nodes and links within the computer network in which router 80 resides, e.g., underlay topology 14 of WAN 12 from FIG. 1. For example, LSDB 102 may include one or more of local/remote internet protocol (IP) addresses, local/remote interface identifiers, link metrics and traffic engineering (TE) metrics, link bandwidth, reservable bandwidth, class of service (CoS) reservation state, preemption, or shared risk link groups (SRLG). Routing component 84 may use BGP-LS 96 to share link state information collected by the IGP link state routing protocols with external components, such as a network controller device, e.g., controller 15 from FIG. 1. Routing component 84 may further use transport mechanisms, such as NETCONF, RESTCONF, or gRPC to enable configuration and retrieval of state information for slice policies from a controller, e.g., controller 15 of FIG. 1. In some examples, routing component 84 may support a YANG data model for the slice policies. Protocols 94 may also include SR-MPLS, RSVP-TE, IPv6, SRv6, Flexible Algorithm, SR-TE, and/or BGP-CT. As described above, routing component 84 may use IGP and/or BGP to facilitate slice aware path placement (e.g., by taking slice specific topological element attributes into account when computing paths for the slice).

Routing tables 104 may describe various routes within the network and the appropriate next hops for each route, i.e., the neighboring routing devices along each of the routes. Routing component 84 analyzes LSDB 102 to generate routing tables 104 and install forwarding data structures into forwarding tables 106 of forwarding component 86.

In accordance with the techniques described in this disclosure, router 80 may receive a slice policy definition for a slice aggregate. If the slice policy specifies a control plane slice policy mode or a data and control plane slice policy mode, routing component 84 may be configured to realize the slice aggregate as specified by the slice policy definition. For example, router 80, operating as an ingress router of a network slicing domain, may receive a slice policy definition including control plane policies for a slice aggregate. In this example, the control plane policies may specify a guaranteed resource (e.g., bandwidth, latency, jitter, etc.), any network resource sharing among slice policies, and/or any priorities to reserve resources for specific slice policies. Routing component 84 may compute paths for the slice aggregate based on the control plane policies specified in the slice policy definition.

As one example, routing component 84 may use LSDB 102 to view the network topology and to compute a path for the slice aggregate (referred to herein as a "slice aggregate path") that is optimized for the resource requirements as specified by the control plane policies. Routing component 84 may install forwarding data structures into forwarding tables 106 of forwarding component 86 for the slice aggregate path. In some examples, routing component 84 may leverage traffic engineering mechanisms, as described in D. Awduche, et al., "Requirements for Traffic Engineering Over MPLS," RFC 2702, September 1999, the entire contents of which is incorporated by reference herein.

Routing component 84 may generate a separate one of routing tables 104 and forwarding tables 106 for each of the slice aggregates in which router 80 participates. The separate routing and forwarding tables created for each of the slice aggregates in which router 80 participates are called Virtual Routing and Forwarding (VRF) tables. In general, one of routing tables 104 comprises a global routing table for the entire computer network in which router 80 resides, e.g., underlay topology 14 of WAN 12 from FIG. 1.

Although the path computation is described with respect to router 80, path computation for the slice aggregate may also be performed by a path computation engine external to router 80, in some examples.

Routing component 84 may map paths for a slice aggregate to one or more VPNs (e.g., layer 2 or layer 3). In this example, the VRF instance traffic that arrives on router 80 via IFCs 88 may be directly mapped to a specific slice aggregate path. Interfaces of router 80 may be further partitioned (e.g., using VLANs) to allow mapping of one or more VLANs to specific slice aggregate paths.

In some examples, routing component 84 may be configured to steer traffic to specific destinations directly over multiple slice policies. This allows traffic arriving on any of IFCs 88 and targeted to such destinations to be directly steered over the slice paths.

In some examples, routing component 84 may utilize a data plane firewall filter or classifier to enable matching of several fields in the incoming packets to determine whether the packet is steered on a specific slice aggregate. This allows for applying a rich set of rules to identify specific packets to be mapped to a slice aggregate.

Routing component 84 may also use routing protocols (e.g., IS-IS, OSPF, and BGP) to advertise slice aggregate link state information. For example, routing component 84 may use routing protocols to advertise current resource reservations for the slice aggregate, and/or, if network resource reservations are slice aggregate aware, the link state can carry per slice aggregate state (e.g., reservable bandwidth). In this way, path computation may take into account the specific network resources available for a slice aggregate when determining the path for a specific flow. Additional examples of advertising slice aggregate link state information is described in FIGS. 2A-2G, 4A-4D of this disclosure.

Forwarding component 86 operates as the data plane for router 80 for forwarding network traffic. In some examples, forwarding component 86 may comprise one or more packet forwarding engines (PFEs) (not shown) that may each comprise a central processing unit (CPU), memory and one or more programmable packet-forwarding application-specific integrated circuits (ASICs). Forwarding tables 106 may associate, for example, network destinations with specific next hops and corresponding interface ports of IFCs 88. Forwarding tables 106 may be a radix tree programmed into dedicated forwarding chips, a series of tables, a complex database, a link list, a radix tree, a database, a flat file, or various other data structures.

In accordance with the techniques described in this disclosure, forwarding component 86 may be configured to identify a packet belonging to a slice aggregate. For example, router 80 may receive a slice policy definition for a slice aggregate that includes data plane policies specifying a slice selector associated with the slice aggregate, any firewall rules or flow-spec filters, and QoS profiles associated with the slice policy and any classes within it. The slice selector may represent one or more fields within a packet. Based on the slice selector specified in the slice policy definition received from the controller, forwarding component 86 is configured to identify packets carrying the slice selector (illustrated as "slice selector 86"). For example, forwarding component 86 is configured to assign a forwarding address (e.g., IP address or MPLS label) associated with the slice aggregate that is distinguished from the destination address or label carried in the packet. In this way, forwarding component 86 may, in response to determining a packet includes the forwarding address associated with the slice aggregate, apply a forwarding treatment or S-PHB associated with the slice aggregate to the packet.

In some examples, forwarding component 86 is configured to identify a global identifier slice selector included in a packet to associate the packet with a slice aggregate. The global identifier slice selector is distinguished from the destination address or label carried in the packet. The global identifier slice selector may, in some examples, be an MPLS label. In some examples, a VPN service label may act as a global identifier slice selector to enable VPN packets to be associated with a specific slice aggregate. In some examples, multiple VPN service labels may act as a global identifier slice selector that map a single VPN to the same slice aggregate to allow for multiple egress routers to allocate different VPN service labels for a VPN. In some examples, a range of VPN service labels acting as multiple global identifier slice selectors may map multiple VPN traffic to a single slice aggregate.

In these examples in which a global identifier slice selector is used, forwarding component 86 is configured to determine from the destination address or label the next hop, determine, from the global identifier slice selector included in the packet, the slice aggregate associated with the slice selector, and in response to the determination, apply a forwarding treatment or S-PHB associated with the slice aggregate to the packet. In some examples, a plurality of global identifier slice selectors are mapped to the same slice aggregate.

In the example in which router 80 represents an example implementation of an ingress router to a slice policy domain, forwarding component 86 is configured to include the slice selector associated with a slice aggregate to a packet before sending the packet toward the destination to cause other routers on the path to apply a specific forwarding treatment that guarantees the SLAs for the slice aggregate.

In some examples, forwarding component 86 is configured to include a Differentiated Services (Diffserv) class selector (CS) to the packet (illustrated as "Diffsery CS 109"), which is used to determine a particular forwarding treatment to be applied to traffic belonging to the same slice policy. That is, the Diffsery CS is used to differentiate between different types of traffic carried over the same slice aggregate.

The architecture of router 80 illustrated in FIG. 9 is shown for exemplary purposes only. The techniques of this disclosure are not limited to this architecture. In other examples, router 80 may be configured in a variety of ways. In one example, some of the functionally of control unit 82 may be distributed within IFCs 88 or a plurality of packet forwarding engines (PFEs) (not shown). Control unit 82 may be implemented solely in software, or hardware, or may be implemented as a combination of software, hardware, or firmware. For example, control unit 82 may include one or more processors which execute software instructions. In that case, the various software modules of control unit 82 may comprise executable instructions stored on a computer-readable medium, such as computer memory or hard disk.

Figure 10:
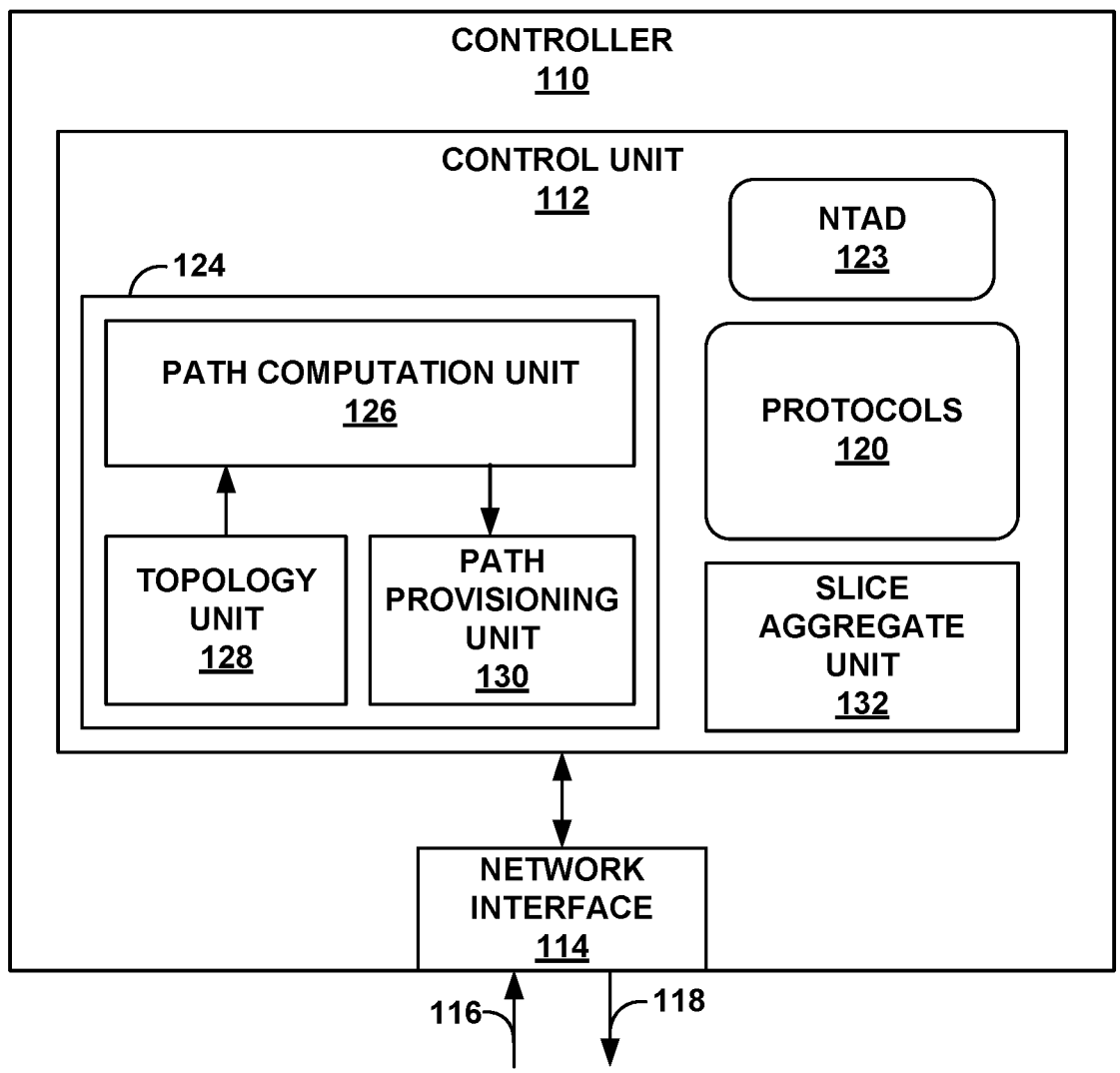
FIG. 10 is a block diagram illustrating an example controller configured to operate in accordance with the techniques of this disclosure.

FIG. 10 is a block diagram illustrating an example controller configured to operate in accordance with the techniques of this disclosure. For purposes of illustration, controller device 110 may be described herein within the context of network system 10 of FIG. 1, and may represent controller 15. The architecture of controller device 110 illustrated in FIG. 5 is shown for example purposes only and should not be limited to this architecture. In other examples, controller device 110 may be configured in a variety of ways.

Controller device 110 includes a control unit 112 coupled to a network interface 114 to exchange packets with other network devices by inbound link 116 and outbound link 118. Control unit 112 may include one or more processors (not shown) that execute software instructions, such as those used to define a software or computer program, stored to a computer-readable storage medium (not shown). Alternatively, or additionally, control unit 112 may comprise dedicated hardware for performing the techniques described herein.

Control unit 112 provides an operating environment for path computation element (PCE) 124, network topology abstractor daemon (NTAD) 123, and slice aggregate unit 132. In one example, these units may be implemented as one or more processes executing on one or more virtual machines of one or more servers. That is, while generally illustrated and described as executing on a single controller device 110, aspects of these units may be delegated to other computing devices. Control unit 112 also provides an operating environment for several protocols 120, including NETCONF, RESTCONF, gRPC, or routing protocols (e.g., IGP or BGP) to distribute slice policy definition to network devices.

Control unit 112 may, in some examples, use BGP-LS to receive link state information from PE routers within a computer network, e.g., underlay topology 14 of WAN 12 from FIG. 1. Control unit 112 may also forward the received link state information to NTAD 123. NTAD 123 may generate a network topology (e.g., underlay topology 14 of WAN 12 from FIG. 1) based on the received link state information.

As illustrated in FIG. 5, PCE 124 includes a path computation unit 126, a topology unit 128, and a path provisioning unit 130. NTAD 123 may forward the topology data to topology unit 128 of PCE 124. Topology unit 128 may receive the topology data describing available resources of the computer network, including access, aggregation, and edge nodes, interfaces thereof, and interconnecting communication links. Path computation unit 126 of PCE 124 may use the topology data received by topology unit 128 to compute paths across the computer network. Upon computing the paths, path computation unit 126 may schedule the paths for provisioning by path provisioning unit 130. A computed path includes path information usable by path provisioning unit 130 to establish the path in the network. For example, path provisioning unit 130 may send the path information to network devices to instruct the network devices to establish at least a portion of the path in the network. Provisioning a path may require path validation prior to committing the path to provide for packet transport.

Slice aggregate unit 132 may generate a slice policy definition, based on the network slice intent, in accordance with the techniques described in this disclosure. For example, controller 110 may receive (e.g., via an interface of controller 110) a network slice intent that specifies requirements for a slice aggregate, such as the connectivity needs between endpoints (e.g., point-to-point, point-to-multipoint, or multipoint-to-multipoint) with customizable network capabilities that may include data speed, quality, latency, reliability, security, and services. These capabilities may be provided based on a Service Level Agreement (SLA) between a network slice consumer and the provider.

Slice aggregate unit 132 may translate the network slice intent into a slice policy definition in accordance with a network slicing model, as described in this disclosure. Slice aggregate unit 132 may maintain a mapping between one or more network slices and a slice aggregate. As such, slice aggregate unit 132 may configure a slice policy definition for the slice aggregate.

The slice policy definition may include data plane policies, control plane policies, and topology membership policies for a slice aggregate. As described above, slice aggregate unit 132 may specify data plane policies including a slice selector, firewall rules or flow-spec filters, Quality of Service (QoS) profiles associated with the slice aggregate and any classes within the slice aggregate. Slice aggregate unit 132 may specify control plane policies including the amount of resources to be allocated for the network slice, any network resource sharing among network slices (e.g., maximum shared bandwidth), and/or any priorities to reserve resources for specific network slices over others. Slice aggregate unit 132 may specify topology membership policies including one or more policies that dictate node, link, or function network resource topology association for a specific slice policy.

Control unit 112 may use protocols 120, including NETCONF, RESTCONF, gRPC, or routing protocols (e.g., IGP or BGP), to distribute the slice policy definition to network devices via network interface 114.

Figure 11:
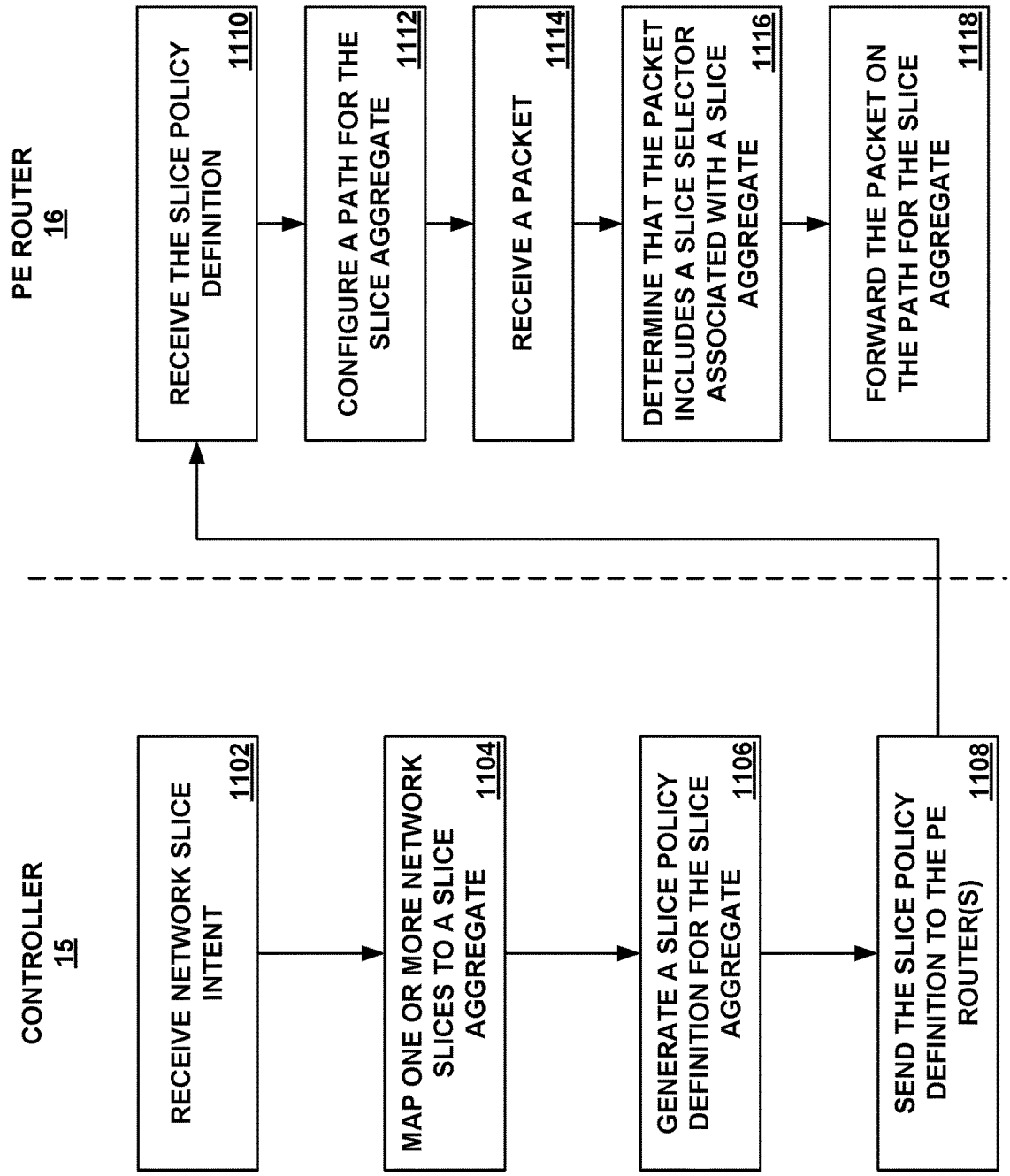
FIG. 11 is an example operation of a controller and network devices configured to enable network slicing, in accordance with the techniques described in this disclosure.

FIG. 11 is an example operation of a controller and network devices configured to enable network slicing, in accordance with the techniques described in this disclosure. For ease of illustration, FIG. 11 is described with respect to controller 15 and PEs 16 of FIG. 1, but may be the operation of any network device that realizes a slice aggregate.

In the example of FIG. 11, controller 15 receives a network slice intent (1102). For example, controller 15 may receive a network slice intent that specifies requirements for a slice aggregate, such as the connectivity needs between endpoints (e.g., point-to-point, point-to-multipoint, or multipoint-to-multipoint) with customizable network capabilities that may include data speed, quality, latency, reliability, security, and services. These capabilities may be provided based on a Service Level Agreement (SLA) between a network slice consumer and the provider. Controller 15 may translate the network slice intent into a slice policy definition in accordance with a network slicing model, as described in this disclosure. Controller 15 may maintain a mapping between one or more network slices and a slice aggregate (1104). Based on the mapping, controller 15 generates a slice policy definition for the slice aggregate (1106). For example, controller 15 generates a slice policy definition including data plane policies, control plane policies, and topology membership policies for a slice aggregate. The data plane policies may include a slice selector (SS), firewall rules or flow-spec filters, Quality of Service (QoS) profiles associated with the slice aggregate and any classes within the slice aggregate. Control plane policies may include the amount of resources to be allocated for the network slice (e.g., maximum guaranteed bandwidth), any network resource sharing requirements among network slices (e.g., maximum shared bandwidth), and/or any priorities to reserve resources for specific network slices over others. Topology membership policies include one or more policies that dictate node, link, or function network resource topology association for a specific slice policy. In response to configuring the slice policy definition, controller 15 sends the slice policy definition to one or more of PEs 16 to instantiate the slice aggregate (1108). For example, controller 15 may use, for example, NETCONF, RESTCONF, gRPC, or other transport mechanism to send the slice policy definition to PEs 16. In some examples, controller 15 may send the slice policy definition to one or more proxy nodes (e.g., any of PEs 16 or other nodes in WAN 12) to distribute the slice policy definition to each of PEs 16 using, for example, routing protocols such as IGP and/or BGP.

In response to receiving the slice policy definition (1110), PEs 16 (e.g., PE 16A) configures a path, based on the slice policy definition, for the slice aggregate (1112). For example, a routing component of PE 16A (e.g., routing component 84 of FIG. 9) may maintain an LSDB (e.g., LSDB 102 of FIG. 9) configured to store link state information about nodes and links within the computer network in which PE 16A resides, e.g., underlay topology 14 of WAN 12 from FIG. 1. The LSDB may include one or more of local/remote internet protocol (IP) addresses, local/remote interface identifiers, link metrics and traffic engineering (TE) metrics, link bandwidth, reservable bandwidth, class of service (CoS) reservation state, preemption, or shared risk link groups (SRLG). PE 16A may use the LSDB to view the network topology and to compute a path for the slice aggregate (referred to herein as a "slice aggregate path") that is optimized for the resource requirements as specified by the control plane policies. The routing component of PE 16A may install forwarding data structures into forwarding tables of its forwarding component (e.g., forwarding tables 106 of forwarding component 86 of FIG. 9) for the slice aggregate path.

The forwarding component of PE 16A (e.g., forwarding component 86 of FIG. 9) is configured to identify a packet belonging to a slice aggregate. Based on the slice selector specified in the slice policy definition received from the controller, the forwarding component of PE 16A is configured to identify packets carrying the slice selector (slice selector 86 of FIG. 9). For example, forwarding component is configured to assign a forwarding address (e.g., IP address or MPLS label) associated with the slice aggregate that is distinguished from the destination address or label carried in the packet. In this way, the forwarding component of PE 16A may, in response to determining a packet includes the forwarding address associated with the slice aggregate, apply a forwarding treatment or S-PHB associated with the slice aggregate to the packet.

In response to receiving a packet (1114), the forwarding component of PE 16A determines whether the packet includes a slice selector associated with a slice aggregate (1116). In response to determining that the packet includes the slice selector, PE 16A forwards the packet on the path for the slice aggregate (1118).

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively, or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. A network controller comprising:
a memory;
one or more processors operably coupled to the memory, wherein the one or more processors are configured to:
receive a network slice intent to instantiate a plurality of network slices having a logical network topology to connect a plurality of network slice endpoints using one or more nodes of an underlay network in accordance with one or more Service Level Objectives (SLOs);
map the plurality of network slices to a slice aggregate, wherein the slice aggregate comprises one or more packet flows belonging to the plurality of network slices;
generate a slice policy definition for the slice aggregate, wherein the slice policy definition comprises:
a global identifier slice selector used to identify the slice aggregate, wherein the global identifier slice selector comprises at least one of a single forwarding address or a single Multiprotocol Label Switching (MPLS) label associated with the slice aggregate, and
one or more network resource requirements for the slice aggregate to meet the one or more SLOs; and
send the slice policy definition to the one or more nodes of the underlay network to cause the one or more nodes to identify, based on the global identifier slice selector, the slice aggregate and to allocate one or more network resources for the slice aggregate, based on the one or more network resource requirements for the slice aggregate, for forwarding a packet including the global identifier slice selector along a path of the slice aggregate, wherein the global identifier slice selector in the packet is independent of a forwarding address or MPLS label associated with a destination of the packet.

2. The controller of claim 1, wherein the slice policy definition comprises:
a data plane policy comprising at least the global identifier slice selector;
a control plane policy comprising at least an amount of the one or more network resources to be allocated, a network resource sharing requirement to share the one or more network resources with a plurality of slice aggregates, or a reservation priority to prioritize the one or more network resources for one or more slice aggregates of the plurality of slice aggregates; and
a topology membership policy comprising a topology filter policy that specifies a network topology for the slice aggregate.

3. The controller of claim 2, wherein the topology filter policy comprises a flexible-algorithm definition or a multi-topology identifier.

4. A node of a plurality of nodes of an underlay network, the node comprising:
a forwarding component comprising processing circuitry; and
a routing component comprising processing circuitry and configured to:
receive, from a controller, a slice policy definition, wherein the slice policy definition comprises:
a global identifier slice selector to identify to a slice aggregate, wherein the slice aggregate comprises one or more packet flows belonging to a plurality of network slices having a logical network topology to connect a plurality of network slice endpoints using one or more nodes of an underlay network in accordance with one or more Service Level Objectives (SLOs), wherein the global identifier slice selector comprises at least one of a single forwarding address or a single Multiprotocol Label Switching (MPLS) label associated with the slice aggregate, and
one or more network resource requirements for the slice aggregate to meet the one or more SLOs;

identify, based on the global identifier slice selector, the slice aggregate;
configure, based on the one or more network resource requirements for the slice aggregate, a path for the slice aggregate; and
wherein, based on the configuration of the path for the slice aggregate, the processing circuitry of the forwarding component is configured to:
receive a packet; and
based on determining that the packet includes the global identifier slice selector, forward the packet along the path for the slice aggregate, wherein the global identifier slice selector in the packet is independent of a forwarding address or MPLS label associated with a destination of the packet.

5. The node of claim 4,
wherein the node is an ingress node to the slice aggregate, and
wherein, to forward the packet along the path, the forwarding component is further configured to include the global identifier slice selector in the packet.

6. The node of claim 5, wherein, to forward the packet along the path, the forwarding component further configured to include a Differentiated Service Class Selector in the packet to differentiate the packet from among a plurality of packets associated with the slice aggregate.

7. The node of claim 4, wherein the routing component is further configured to:
send a routing protocol message including slice aggregate information to another node of the plurality of nodes.

8. The node of claim 7, wherein the slice aggregate information comprises one or more of an indication that the node is capable of slice aggregate aware traffic engineering, link identification information for a link of the slice aggregate, attributes of the link, unreserved bandwidth of the link, residual bandwidth of the link, available bandwidth of the link, utilized bandwidth of the link, a prefix-segment identifier of the slice aggregate, an adjacency-segment identifier of the slice aggregate, a local area network (LAN) adjacency-segment identifier, or a segment routing version 6 segment identifier.

9. The node of claim 7, wherein the routing protocol message includes at least one of an intermediate system to intermediate system (IS-IS) protocol message, or an Open Shortest Path First (OSPF) protocol message, or a Border Gateway Protocol (BGP) message.

10. The node of claim 4, wherein to receive the slice policy definition, the routing component is further configured to:
receive a routing protocol message including the slice policy definition from another node of the plurality of nodes.

11. The node of claim 10, wherein the routing protocol message includes at least one of an intermediate system to intermediate system (IS-IS) protocol message, or an Open Shortest Path First (OSPF) protocol message, or a Border Gateway Protocol (BGP) message.

12. A method comprising:
receiving, from a controller and by a node of a plurality of nodes in an underlay network, a slice policy definition, wherein the slice policy definition comprises:
a global identifier slice selector to identify a slice aggregate, wherein the slice aggregate comprises one or more packet flows belonging to a plurality of network slices having a logical network topology to connect a plurality of network slice endpoints using one or more nodes of an underlay network in accordance with one or more Service Level Objectives (SLOs), wherein the global identifier slice selector comprises at least one of a single forwarding address or a single Multiprotocol Label Switching (MPLS) label associated with the slice aggregate, and one or more network resource requirements for the slice aggregate to meet the one or more SLOs;

identifying, by the node and based on the global identifier slice selector associated with the slice aggregate, the slice aggregate;

configuring, by the node and based on the one or more network resource requirements for the slice aggregate, a path for the slice aggregate;

receiving, by the node, a packet; and based on determining that the packet includes the global identifier slice selector, forwarding, by the node, the packet along the path for the slice aggregate, wherein the global identifier slice selector in the packet is independent of a forwarding address or MPLS label associated with a destination of the packet.

13. The method of claim 12, wherein the node is an ingress node to the slice aggregate, and wherein forwarding the packet along the path comprises including the global identifier slice selector in the packet.

14. The method of claim 13, wherein, forwarding the packet along the path comprises including a Differentiated Service Class Selector in the packet to differentiate the packet from among a plurality of packets associated with the slice aggregate.

15. The method of claim 12, wherein receiving the slice policy definition comprises:

receiving a routing protocol message including slice aggregate information from another node of the plurality of nodes, wherein the routing protocol message includes at least one of an intermediate system to intermediate system (IS-IS) protocol message, or an Open Shortest Path First (OSPF) protocol message, or a Border Gateway Protocol (BGP) message.

16. The method of claim 15, wherein the slice aggregate information comprises one or more of an indication that the node is capable of slice aggregate aware traffic engineering, link identification information for a link of the slice aggregate, attributes of the link, unreserved bandwidth of the link, residual bandwidth of the link, available bandwidth of the link, utilized bandwidth of the link, a prefix-segment identifier of the slice aggregate, an adjacency-segment identifier of the slice aggregate, a local area network (LAN) adjacency-segment identifier, or a segment routing version 6 segment identifier.

17. The controller of claim 1, wherein the one or more processors are further configured to:

send the slice policy definition to a proxy node using a transport mechanism including at least one of NETCONF, RESTCONF, or gRPC, and wherein the proxy node is configured to send, to other nodes of the one or more nodes, a routing protocol message including the slice policy definition, wherein the routing protocol message includes at least one of an intermediate system to intermediate system (IS-IS) protocol message, or an Open Shortest Path First (OSPF) protocol message, or a Border Gateway Protocol (BGP) message.

* * * * *